US005187496A

United States Patent [19]

Yu

[11] Patent Number: 5,187,496

[45] Date of Patent: * Feb. 16, 1993

[54] FLEXIBLE ELECTROGRAPHIC IMAGING MEMBER

[75] Inventor: Robert C. U. Yu, Webster, N.Y.

[73] Assignee: Xerox Corporation, Stamford, Conn.

[ * ] Notice: The portion of the term of this patent subsequent to Jan. 8, 2008 has been disclaimed.

[21] Appl. No.: 604,282

[22] Filed: Oct. 29, 1990

[51] Int. Cl.$^5$ .............................................. G01D 9/00

[52] U.S. Cl. ................................ 346/135.1; 428/220; 428/323; 428/332; 428/337

[58] Field of Search ............................ 346/134, 135.1; 428/220, 323, 332, 337, 195

[56] References Cited

U.S. PATENT DOCUMENTS

| | | | |
|---|---|---|---|
| 3,861,942 | 1/1975 | Guestaux | 117/34 |
| 4,042,399 | 8/1977 | Kiesslich | 96/87 R |
| 4,112,172 | 9/1978 | Burwasser et al. | 428/337 X |
| 4,202,937 | 5/1980 | Fukuda et al. | 430/58 |
| 4,209,584 | 6/1980 | Joseph | 430/527 |
| 4,265,990 | 5/1981 | Stolka et al. | 430/59 |
| 4,335,173 | 6/1982 | Caraballo | 428/65 |
| 4,381,337 | 4/1983 | Chang | 430/58 |
| 4,390,609 | 6/1983 | Wiedemann | 430/58 |
| 4,391,888 | 7/1983 | Chang et al. | 430/57 |
| 4,463,363 | 7/1984 | Gundlach et al. | 346/159 |
| 4,524,371 | 6/1985 | Sheridon et al. | 346/159 |
| 4,617,207 | 10/1986 | Ueki et al. | 428/332 X |
| 4,644,373 | 2/1987 | Sheridan et al. | 346/159 |
| 4,654,284 | 3/1987 | Yu et al. | 430/59 |
| 4,772,526 | 9/1988 | Kan et al. | 430/58 |
| 4,983,481 | 1/1991 | Yu | 430/59 |

*Primary Examiner*—George H. Miller, Jr.
*Assistant Examiner*—Randy W. Gibson

[57] ABSTRACT

An electrographic imaging member including:

(a) a flexible dielectric imaging layer having a uniform thickness of between about 10 micrometers and about 50 micrometers and including a thermoplastic film forming polymer, and (b) a flexible supporting substrate having an electrically conductive surface, the substrate including:

(1) a single substrate layer having a uniform thickness of between about 25 micrometers and about 200 micrometers and including a thermoplastic film forming polymer or (2) dual layers comprising an inner substrate layer and an outer substrate layer, the inner substrate layer having a uniform thickness of between about 25 micrometers and about 200 micrometers and including a thermoplastic film forming polymer and the outer substrate layer having a uniform thickness of between about 10 micrometers and about 50 micrometers and including a thermoplastic film forming polymer, wherein the linear tension force measured in any direction along the plane of the dielectric imaging layer is substantially the same as the linear tension force measured along the plane of the outer substrate layer in the same direction as the direction selected for measuring the linear tension force in the dielectric imaging layer to impart a flat shape to the electrographic imaging member. A method of using this member in an electrographic imaging process is also disclosed.

22 Claims, No Drawings

FLEXIBLE ELECTROGRAPHIC IMAGING MEMBER

BACKGROUND OF THE INVENTION

This invention relates in general to electrography and, more specifically, to a flexible, curl resistant electrographic imaging member.

In the art of electrography, an electrostatic latent image is formed on a dielectric imaging layer (electroreceptor) by various techniques such as by an ion stream (ionography), stylus, shaped electrode, and the like. Development of the electrostatic latent image may be effected by the application of electrostatically charged marking particles.

Ion stream electrographic imaging may be accomplished with the aid of ion projection heads. Movement of the ion stream may be assisted by means of a fluid jet introduced into an ion projection head. For example, fluid jet assisted ion projection heads in electrographic marking apparatus for ion projection printing may utilize ions generated in a chamber, entrained in a rapidly moving fluid stream passing into, through and out of the chamber, modulated in an electroded exit zone by being selectively emitted or inhibited therein, and finally deposited in an imagewise pattern on a relatively movable charge receptor (electroceptor). More specifically, the ion projection head may comprise a source of ionizable, pressurized transport fluid, such as air, and an ion generation housing, having a highly efficient entrainment structure and a modulation structure. Within the ion generation housing there is a corona generator comprising a conductive chamber surrounding a wire, and an entrainment structure which comprises an inlet opening for connecting the source of ionizable fluid into the chamber and for directing the fluid through the corona generator, and an outlet opening for removing ion entraining transport fluid from the chamber. The exiting ion laden transport fluid is directed adjacent to the modulation structure for turning "on" and "off" the ion flow to the charge receptor surface. The chamber, the corona generating source, the inlet opening, the outlet opening and the modulation structure each extends in a direction transverse to the direction of relative movement of the electroceptor. The electroceptor may be uniformly charged by suitable means such as a corona charging device, brush charging, induction charging devices and the like, prior to imagewise discharge of the uniformly charged electroceptor by means of a fluid jet assisted ion projection head. In conventional xerography, corona charging is carried out with a device having a high charge output and a large opening such as a corotron so that a high voltage may be deposited on thick photoconductive insulating layers. A thin electroceptor of less than one half mil having a dielectric constant of about 2 or 3 will not charge up to high electric potentials used in conventional zerography on thick photoconductive insulating layers. Thus, if such an electroceptor is employed in an ordinary ion projections electrographic printing system and is uniformly charged with a device having a high charge output and a large opening such as a corotron, it cannot be charged to high electric potentials. In ionographic systems utilizing fluid jet assisted ion projection heads, only a small amount of ions are emitted due to modulation requirements. Therefore, imagewise discharge of a uniformly charged electroceptor by means of a fluid jet assisted ion projection head results in only a slight change in potential and development density of the electrostatic latent image is poor due to low contrast potential. In U.S. Pat. No. 4,524,371 to N. Sheridon et al, issued June 18, 1985, a fluid jet assisted ion projection printing apparatus is described comprising a housing including ion generating and ion modulating regions. The fluid jet dislodges ions from an electrically biased wire and requires high flow rates to achieve higher deposited charge density. Fluid jet assisted ion projection printing systems are well known and described, for example, in U.S. Pat. No. 4,463,363, U.S. Pat No. 4,524,371 or U.S. Pat. No. 4,644,373. The entire disclosures of U.S. Pat. No. 4,463,363, U.S. Pat. No. 4,524,371 and U.S. Pat. No. 4,644,373 are incorporated herein by reference. If desired, other means such as a stylus, instead of fluid jet ion projection, may be used to charge an electroceptor.

Electrographic imaging members and electrographic methods of using the members are well known and disclosed, for example in the patent literature and also in copending U.S. patent application Ser. No. 07/459,401, filed on Dec. 29, 1989 in the name of J. Frank et al, the entire disclosure of this copending application being incorporated herein by reference.

Some prior art xerographic photoreceptors having a thickness of at least about 25 micrometers (1 mil) have been charged to relatively high voltages because of an unlimited power source such as a corotron which are not charge limited. Unfortunately, xerographic photoreceptors require expensive special shipping and storage treatment for protection from temperature extremes or fluctuations, exposure to sun light, contact with reactive fumes and the like. Moreover, special shutter systems, particularly automatic shutter systems, are required in xerographic machines to protect the photoreceptor when it is in use or when it is not in use. Further, photoreceptors are usually sensitive to heat and must be located a safe distance from fusers thereby limiting flexibility in machine architecture design. Also, photoreceptors are sensitive to toner filming, fatigue and surface cracking. In addition, the coefficient of friction, surface energy and the like of photoreceptors materials, particularly the surface, cannot be readily tailored to accommodate different machine components such as blade cleaning systems. Moreover, cycle up and cycle down problems are a common characteristic of photoreceptors.

A dielectric layer for use in electrography may be a homogeneous layer of a single material such as a film forming polymer or inorganic solid or it may be a composite layer containing a particulate dielectric material dispersed in a continuous dielectric matrix material. Generally, the dielectric layer is supported on a layer comprising an electrically conductive material. The electrically conductive material may, in turn, be supported on a supporting substrate or the electrically conductive material may itself form the supporting substrate. The supporting substrate may be rigid or flexible.

When flexible substrates for electrographic imaging belts for electrography are coated with a dielectric layer and the applied coating is dried at an elevated temperature, the edges of the resulting belt curl upwardly when the belt is cooled to ambient temperatures. Such curling is undesirable because the uneven surface of the imaging member interferes with optimum formation of electrostatic latent images, particularly when the images are formed by ionographic imaging techniques.

Moreover, curled electrographic imaging surfaces adversely affect the quality of the toner images formed during development. Moreover, such uneven surface of the imaging member can cause incomplete or partial transfer of the toner image to receiving members. A curled flexible electrographic imaging member requires considerable tension to flatten the member against a supporting member before sufficient flatness can be achieved. This can result in the development of an excessive amount of creep and may even cause tearing.

INFORMATION DISCLOSURE STATEMENT

U.S. Pat. No. 4,654,284 to Yu et al issued May 31, 1987, an electrostatographic imaging member is disclosed with an anti-curl layer comprising a film forming binder, crystalline particles dispersed in the film forming binder and a reaction product of a bi-functional chemical coupling agent with both the film forming binder and the crystalline particles.

U.S. Pat. No. 4,209,584 to Joseph issued Jun. 24, 1980, photographic elements are disclosed comprising a support coated on one side with at least one image-forming layer, and on the opposite side with separate anticurl and anti static layers in contiguous relationship. The anticurl coating preferably comprises a hydrophilic colloid.

U.S. Pat. No. 4,042,399 to Kiesslich issued Aug. 16, 1977, photographic elements are disclosed comprising an antihalation back coat applied from a solution which, in addition to usual wetting agents and hardeners, contains water, gelatin and antihalation dye. See for example, column 7, Example 4.

U.S. Pat. No. 4,335,173 to Caraballo issued Jun. 15, 1982, a flexible recording device is disclosed comprising an amorphous cushioning layer, a flexible encompassing layer and, optionally, a flexible protective layer. The flexible support layer may comprise any flexible material and particularly poly(ethylene terephthalate). See, for example, column, 5 lines 25-32. The composition of the flexible encompassing layer is discussed, for example, at column 7 lines 33-49. The composition of the amorphous cushioning layer is discussed, for example, at column 6 lines 37-59.

U.S. Pat. No. 3,861,942 to Guestaux, issued Jan. 21, 1975—A concave curvature is imparted to the backing surface of a polyester photographic film support (prior to coating the other surface) by treating the back surface with a volatile phenolic compound and a surfactant in a volatile solvent and drying and heating the film above the second order transition temperature of the polyester to volatize them materials from the surface. A flat photographic film product having no anti-curl backing layer is produced from the concavely curved film upon coating the other surface of the film with one or more layers of the usual coatings used in the structure on the photosensitive side of the film, at least one of the layers being such that it shrinks when drying and imparts a compensating countercurvature force to the film, thereby flattening the film.

U.S. Pat. No. 4,265,990 to Stolka et al, issued May 5, 1981—A photosensitive member is disclosed comprising a support layer, a charge generating layer and a charge transport layer. The transport layer may comprise a diamine and a polycarbonate resin. Aluminized Mylar is mentioned as a preferred substrate.

U.S. Pat. No. 4,381,337 to Chang et al, issued Jul. 5,1983—A photoconductive element is disclosed comprising an electroconductive support, an adhesive layer, a charge generating layer and a charge transport layer. A mixture of a polyester having a glass transition temperature larger than about 60° C. with a polyester having a glass transition temperature smaller than about 30° C. is employed in the adhesive layer and in the charge transport layer. The support, for example, may be an aluminized polyethylene terephthalate film. The charge transport layer also contains suitable charge transport chemicals and an organic binder.

U.S. Pat. No. 4,391,888 to Chang et al, issued Jul. 5, 1983—A multilayered organic photoconductive element is disclosed having a polycarbonate barrier layer and a charge generating layer. A polycarbonate adhesive bonding layer is included on the electroconductive support to provide a receptive and retentive base layer for the charge generating layer.

U.S. Pat. No. 4,390,609 to Wiedemann, issued June 28, 1983—An electrophotographic recording material is disclosed comprising an electrically conductive support, an optional insulating intermediate layer, at least one photoconductive layer comprising a charge generating compound and a charge transporting compound and a protective transparent layer. Various binders are listed, for example in column 5, lines 8-19. The protective transparent cover layer comprises a surface abrasion resistant binder composed of a polyurethane resin, a polycarbonate resin, a polyurethane, or a polyisocyanate as well as numerous other binders.

U.S. Pat. No. 4,772,526 to Kan et al, issued Sep. 20, 1988—An electrophotographic element is disclosed having a photoconductive surface layer including a binder resin comprising a block copolyester or copolycarbonate having a fluorinated polyether block. The polyester or polycarbonate segments form a continuous phase which gives physical strength to the imaging member while the polyether blocks form a discontinuous phase and provide optimal surface properties.

U.S. Pat. No. 4,202,937 to Fukuda et al, issued May 13, 1980—An electrophotographic photosensitive member is disclosed comprising a support layer, a charge injection layer, a subsidiary charge injection layer, a photoconductive layer and an insulating layer. An insulating layer may be also interposed between the support layer and the charge injection layer. The support appears to be made of metal.

U.S. patent application Ser. No. 07/459,401, filed in the name of J. Frank et al on Dec. 29, 1989—An ionographic imaging member is disclosed comprising a conductive layer and a uniform and continuous dielectric imaging layer free of voids, the imaging layer having a dielectric constant of from about 1.5 to about 40 and a thickness of at least about 45 micrometers, the thickness divided by the dielectric constant having a value of from about 30 to about 60 micrometers. This member may be used in an ionographic imaging process.

Thus, the characteristics of flexible electrographic imaging members comprising a supporting substrate in combination with a dielectric imaging layer exhibit deficiencies which are undesirable in electrographic imaging systems.

SUMMARY OF THE INVENTION

It is an object of the invention to provide an electrographic imaging member which overcomes the above-noted disadvantages.

It is an another object of this invention to provide a thin, flexible electrographic imaging member with improved resistance to curling.

It is yet an another object of this invention to provide a thin, flexible electrographic imaging member with improved resistance to cracking when exposed to liquid inks.

It is still another object of this invention to provide a thin, flexible electrographic imaging member with improved layer adhesion and resistance to delamination.

The foregoing objects and others are accomplished in accordance with this invention by providing an electrographic imaging member comprising:

(a) a flexible dielectric imaging layer having a uniform thickness of between about 10 micrometers and about 50 micrometers and comprising a thermoplastic film forming polymer, and (b) a flexible supporting substrate having an electrically conductive surface, the substrate comprising:

(1) a single substrate layer having a uniform thickness of between about 25 micrometers and about 200 micrometers and comprising a thermoplastic film forming polymer or (2) dual layers comprising an inner substrate layer and an outer substrate layer, the inner substrate layer having a uniform thickness of between about 25 micrometers and about 200 micrometers and comprising a thermoplastic film forming polymer and the outer substrate layer having a uniform thickness of between about 10 micrometers and about 50 micrometers and comprising a thermoplastic film forming polymer, wherein the linear tension force $F_{t1}$ measured in any direction along the plane of the dielectric imaging layer is substantially the same as the linear tension force $F_{t2}$ measured along the plane of the outer substrate layer in the same direction as the direction selected for measuring $F_{t1}$ in the dielectric imaging layer to impart a flat shape to the electrographic imaging member wherein the $F_{t1}$ is:

$$=(A_1)(M_1)[\Delta t_1(\epsilon_1-\epsilon_S)]$$

and the $F_{t2}$ is:

$$=(A_2)(M_2)[\Delta t_2(\epsilon_2-\epsilon_S)]$$

wherein:

$A_1$ is the cross section of the dielectric imaging layer, $A_2$ is the cross section of the outer substrate layer, $M_1$ is Young's Modulus of the dielectric imaging layer, $M_2$ is Young's Modulus of the outer substrate layer, $\Delta t_1$ is the difference between ambient temperature and the highest processing temperature of the dielectric imaging layer, $\Delta t_2$ is the difference between ambient temperature and the highest processing temperature of the outer substrate layer, $\epsilon_1$ is the thermal coefficient of contraction of the dielectric imaging layer, $\epsilon_S$ is the thermal coefficient of contraction of the inner substrate layer, and $\epsilon_2$ is the thermal coefficient of contraction of the outer substrate layer.

The flexible supporting substrate member may comprise any suitable flexible web or sheet having a relatively thick single layer or two relatively thick layers. The linear tension force measured in any direction along the plane of the outer substrate layer (layer out of contact with the dielectric layer) should be substantially the same as the linear tension force in any direction along the plane of the dielectric imaging layer measured in the same direction as the direction selected for measuring the linear tension force measured along the plane of the outer substrate layer. When the thermal coefficient of contraction of the dielectric imaging layer is substantially the same as that of the thermal coefficient of contraction of the inner substrate layer, an outer substrate layer is not required to achieve imaging member flatness and the resulting imaging member would merely comprise a dielectric imaging layer and a single substrate layer. The flexible supporting substrate member may be opaque or substantially transparent and may comprise numerous suitable materials having the required mechanical properties. The flexible supporting substrate member should have an electrically conductive surface on the side of the member that is coated with the dielectric imaging layer. The flexible supporting substrate member may comprise an underlying relatively thick flexible insulating support member coated with a thin, flexible electrically conductive layer, or merely a relatively thick flexible conductive member having sufficient internal strength to support the dielectric imaging layer. The electrically conductive surface material should have a surface resistivity of less than about $10^4$ ohm-cm at between about 5 percent to about 80 percent relative humidity and between about 16° C. (60° F.) and about 50° C. (122° F.) in order to provide adequate electrical grounding under normal electrographic imaging conditions. The electrically conductive surface material may be the same composition as that comprising the entire supporting substrate member or may merely be a thin coating on an underlying substantially thick flexible web member. Where the electrically conductive surface is a thin coating on an underlying flexible web member, the electrically conductive layer may comprise any suitable electrically conductive material including, for example, aluminum, titanium, nickel, chromium, brass, gold, stainless steel, carbon black, graphite and the like. The thin flexible conductive layer may comprise a thin, separate metallic conductive layer having a thickness of between about 100 angstroms and about 500 angstroms. The distortion forces applied by this extremely thin conductive layer to the relatively thick substrate layer has negligible effects and the relatively thick substrate layer having high beam rigidity will tend to maintain its original shape. The underlying relatively thick flexible supporting substrate layer or layers comprise any suitable thermoplastic film forming polymer along or a thermoplastic film forming polymer in combination with minor amounts of other materials such as organic or inorganic fillers including, for example, conductive particles of metal, carbon black and the like. Typical underlying flexible supporting substrate layers comprise thermoplastic film forming polymers including various resins such as polyethersulfone resins, polysulfone resins, polyether ether ketone resins, polycarbonate resins, polyvinyl fluoride resins, polystyrene resins, styrene acrylonitrile copolymer resins, polyethylene terephthalate resins, polyphenylene sulfide resins, polyamide resins, polyamide imide resins, polyether imide resins, polyimide resins, and the like. Preferred supporting substrate member materials are polyethersulfone (e.g. Stabar S-100, available from ICI), polyvinyl fluoride (e.g. Tedlar, available from E. I. duPont de Nemours & Company), polybisphenol-A carbonate (e.g. Makrofol, available from Mobay Chemical Company), amorphous polyethylene terephthalate (e.g. Melinar, available from ICI Americas, Inc.), biaxially oriented polyethylene terephthalate (e.g. Melinex, available from ICI Americas, Inc. or Mylar, available from E. I. duPont de Nemours & Company, or Hostaphan, available from American Hoechst), and biaxially oriented polyimide (e.g., Kapton, available from E. I. duPont de Nemours & Company, or Upilex, available from ICI America, Inc.).

The coated or uncoated flexible supporting substrate member is highly flexible and may have any number of different configuration such as, for example, a web, a sheet, a scroll, an endless flexible belt, and the like. Preferably, the supporting substrate member is in the form of an endless flexible belt and comprises a commercially available polyethersulfone resin known as Stabar S-100, available from ICI. This substrate member material is preferred because it has a thermal contraction (or expansion) coefficient that is closely matched with that of the preferred dielectric imaging layer materials. Preferred dielectric imaging materials include, for example, polycarbonate, polystyrene, styrene acrylonitrile copolymer, polysulfone, polyarylate, polyacrylate, and the like. Other preferred supporting substrate material include biaxially oriented polyethylene terephthalate (e.g., Melinex, available for ICI; Mylar, available for E. I. duPont de Nemours & Company; Hostaphan, available from American Hoechst); and biaxially oriented polyimide (e.g., Kapton, available from E. I. duPont De Nemours & Company or Upilex, available from ICI). the preferred dielectric imaging material having substantially the same coefficient of thermal expansion as the aforesaid supporting substrate materials include, for example, copolyesters (e.g. 49000, available from E. I. duPont de Nemours & Company, or Vitel PE-100, Vitel PE-200, Vitel PE-307, Vitel PE-5545, Vitel PE-5571 or Vitel PE-5833, each of the Vitels being available from Goodyear Tire & Rubber Co.), polyethylene terephthalate glycol, (e.g., Kodar PETG, available from Eastman Chemical Products, Inc.) and polycyclohexylenedimethylene terephthalate glycol (e.g., Kodar PCTG, available from Eastman Chemical Products, Inc.).

The thermoplastic film forming polymers employed in the substrate and in the dielectric imaging layer of the electrographic imaging members of this invention have thermal expansion or contraction characteristics including a linear thermal expansion or contraction coefficient in response to the rise and fall in temperature. The linear thermal contraction coefficient of the supporting substrate layer and the linear thermal contraction coefficient of the dielectric imaging layer are each defined as the fractional dimensional shrinking of the layer per °C. upon cooling. The thermal contraction coefficient characteristics are determined for the supporting substrate member and dielectric imaging layer by measurements taken in two directions along the plane of the supporting substrate member and dielectric imaging layer, the two directions being about 90° apart. The thermal contraction coefficient (or expansion) may be determined by well known ASTM techniques, including those described, for example, in "Standard Test Method for Coefficient of Cubicle Thermal Expansion of Plastics, ASTM Designation: D 864-52" (Reapproved 1978); "Standard Test Method for Linear Thermal Expansion of Solid Materials with a Vitreous Silica Dilatometer", ASTM Designation: E 228-85; and "Standard Test of Coefficient of Linear Thermal Expansion of Plastics", ASTM Designation: D 696-79. The thermal contraction coefficient for plastics involves a reversible thermal change in length per unit length resulting from a temperature change during cooling. Since the glass transition temperature of both the supporting layer and the dielectric layer are greater than the machine operating temperatures, the measurements of thermal contraction for each material are taken at temperatures below the glass transition temperatures of the film forming polymers in the supporting substrate member and dielectric imaging layer. The measurements may be made with any suitable device such as a conventional dilatometer. The thermal contraction coefficient varies significantly when the glass transition temperature is exceeded. Therefore, the thermal contraction coefficient value for purposes of this invention is measured at a temperature below the glass transition temperature. A typical procedure for measuring the thermal contraction coefficient is ASTM D 696-79 Standard Test Method for Coefficient of Linear Thermal Expansion of Plastics. As is well known in the art, the thermal contraction coefficient of a material is the same as the thermal expansion coefficient of that material. For purposes of testing to determine the thermal contraction coefficient of a given type of material, each layer is formed and tested as an independent layer. Preferably, the polymeric substrate has a linear thermal contraction coefficient range between about $5.6\times10^{-5}$/° C. and about $7.5\times10^{-5}$/° C. This range is preferred because it closely matches the linear thermal contraction coefficient range of the preferred dielectric imaging layers such as polycarbonate, polystyrene, polyarylate, polystyrene acrylonitrile, polyacrylate, polysulfone, and the like. Other polymeric substrates having a linear thermal contraction coefficient range between about $1.5\times10^{-5}$/° C. and about $2.5\times10^{-5}$/° C. are also preferred because they closely match the linear contraction coefficient of the preferred dielectric imaging layers such as, for example, copolyesters (e.g. 49000, available from E. I. duPont de Nemours & Company, or Vitel PE-100, Vitel PE-200, Vitel PE-307, Vitel PE-5545, Vitel PE-5571 or Vitel PE-5833, each of the Vitels being available from Goodyear Tire & Rubber), copolyester glycols (e.g. polyethylene terephthalate glycol, Kodar PETG, or polycyclohexylenedimethylene terephthalate glycol, Kodar PCTG, available from Eastman Chemical Products, Inc.).

The film forming polymers employed in the supporting substrate member and in the dielectric imaging layer should preferably be isotropic and not anisotropic. An isotropic material is defined as a material having physical and mechanical properties that are identical in all directions. Isotropic materials do not alter the dimensional ratios of the materials when heated or cooled whereas anisotropic materials do alter the dimensional ratios of the materials when heated or cooled. Isotropic materials may be tested by either cubical or linear thermal expansion coefficient tests. An anisotropic material is defined as a material having physical and mechanical properties that are not identical in all directions. An example of an anisotropic material is biaxially oriented polyethylene terephthalate (e.g. Mylar, available from E. I. duPont de Nemours & Co.).

Generally, satisfactory results with one type of preferred dielectric imaging materials may be achieved when the polymeric supporting substrates suitable for the electrographic imaging members of this invention have a thermal contraction coefficient of from about $4.5\times10^{-5}$/° C. to $8.5\times10^{-5}$/° C. [$(-2$ to $+2)\times10^{-5}$/°

C.] in the temperature range of between about 0° C. and about 150° C. More preferably, the polymeric supporting substrates have a thermal contraction coefficient of from about $5.6\times10^{-5}$/° C. to $7.5\times10^{-5}$/° C. [$(-1$ to $+1)\times10^{-5}$/° C.]. For optimum flatness, the polymeric supporting substrates have a thermal contraction coefficient of from about $6\times10^{-5}$/° C. to $7\times10^{-5}$/° C. [$(-0.5$ to $+0.5)\times10^{-5}$/° C.]. With the preferred types of dielectric imaging materials, polymeric substrates which also are suitable for this electrographic imaging member fabrication invention should have a thermal contraction coefficient of from about $1\times10^{-5}$/° C. to $3\times10^{-5}$/° C. [$-0.5$ to $+0.5)\times10^{-5}$/° C.] in the temperature range of between about 0° C. and about 150° C. More preferably, the polymeric supporting substrates have a thermal coefficient of contraction of from about $1.5\times10^{-5}$/° C. to $2.5\times10^{-5}$/° C. [$(-0.1$ to $+0.1)\times10^{-5}$/° C.]. For optimum flatness, the polymeric substrates have a thermal contraction coefficient of from about $1.7\times10^{-5}$/° C. to $2\times10^{-5}$/° C. [$(-0.05$ to $+0.05)\times10^{-5}$/° C.].

Typical polymeric supporting substrate materials are set forth in the Table below:

| TYPE OF POLYMER SUBSTRATE | TRADENAME | $\epsilon_S$* | SUPPLIER |
|---|---|---|---|
| Biaxially Oriented Polyethylene | Mylar | $1.7\times10^{-5}$/°C. | E. I. dupont Nemours & Co. |
| Terephthalate | Melinex | $1.7\times10^{-5}$/°C. | ICI Americas Inc. |
| | Hostephan | $1.7\times10^{-5}$/°C. | American Hoechst Corp. |
| Amorphous Polyethylene Terephthalate | Melinar | $6.5\times10^{-5}$/°C. | ICI Americas Inc. |
| Polysulfone | Stabar S100 | $6.0\times10^{-5}$/°C. | ICI Americas Inc. |
| Polyvinylfluoride | Tedlar | $7.0\times10^{-5}$/°C. | E. I. dupont de Nemours & Co. |
| Polycarbonate | Makrofol | $6.5\times10^{-5}$/°C. | Mobay Chemicals |
| Polyphenylene Sulphite | | $3.0\times10^{-5}$/°C. | ICI Americas Inc. |
| Polyether ether | Stabar K200 | $4.0\times10^{-5}$/°C. | E. I. dupont |
| ketone | Stabar XK300 | $4.0\times10^{-5}$/°C. | Nemours & Co. |
| Polyimide | Kapton | $2.0\times10^{-5}$/°C. | ICI Americas Inc. |
| | Upilex | $2.0\times10^{-5}$/°C. | ICI Americas Inc. |
| Flourinated Ethylene Propylene | | $5.0\times10^{-5}$/°C. | ICI Americas Inc. |

*The symbols $\epsilon_S$ represents the thermal expansion coefficient of the inner substrate layer.

When the substrate member is relatively thick single layer, satisfactory results are achieved with a thickness of between about 25 micrometers and about 200 micrometers. Preferably, the substrate has a thickness of between about 40 micrometers and about 130 micrometers. Optimum results can be obtained when the substrate has a thickness of between about 50 micrometers and about 75 micrometers. When the substrate member thickness is less than about 25 micrometers, the imaging member tends to loose its required beam rigidity for proper imaging member fabrication and handling whereas when the substrate member is greater than about 200 micrometers, the imaging member will become too thick and cause high bending stress to develop in the dielectric imaging layer surface when cycled over a small belt supporting roller, e.g., 19 mm diameter roller, thereby facilitating dynamic fatigue dielectric imaging layer surface cracking during cycling.

When the supporting substrate member comprises only one layer of film forming material, fewer coating operations are necessary and the fabricated electrographic imaging member is thinner. An additional benefit is that the dynamic mechanical life is enhanced and the possible effect of solvent/stress surface cracking when used with a liquid development system is reduced due to lower induced surface bending stress over small belt supporting rollers. However, if desired, the supporting substrate member may comprise a plurality of relatively thick layers of film forming polymers.

When the substrate member comprises two relatively thick layers, satisfactory results are achieved with a thickness for the inner substrate layer between about 25 micrometers and about 200 micrometers. Preferably, the inner substrate layer has a thickness of between about 40 micrometers and about 130 micrometers. Optimum results can be obtained when the inner substrate layer has a thickness of between about 50 micrometers and about 75 micrometers. When the inner substrate layer thickness is less than about 25 micrometers, the imaging member tends to loose its required beam rigidity for proper imaging member fabrication and handling whereas when the inner substrate layer is greater than about 200 micrometers, the imaging member will become too thick and cause high bending stress to develop in the dielectric imaging layer surface when cycled over a small belt supporting roller, e.g., 19 mm diameter roller, thereby facilitating dynamic fatigue dielectric imaging layer surface cracking during cycling. The outer substrate layer thickness may be between about 10 micrometers and about 50 micrometers. Preferably, the outer substrate layer has a thickness of between about 13 micrometers and about 40 micrometers. Optimum results can be obtained when the outer substrate layer has a thickness of between about 16 micrometers and about 30 micrometers. When the substrate member thickness is less than 10 micrometers, the imaging member may exhibit curling toward the dielectric layer whereas when the substrate member is greater than about 50 micrometers, the imaging member may exhibit curling away from the dielectric imaging layer. Examples of supporting substrate members comprising two relatively thick layers include members comprising an inner layer of biaxially oriented polyethylene terephthalate and an outer layer of polycarbonate, or an inner layer of biaxially oriented polyethylene terephthalate and an outer layer of polystyrene, or an inner layer of biaxially oriented polyethylene terephthalate and an outer layer of styrene acrylonitrile copolymer, or an inner layer of biaxially oriented polyimide and an outer layer of polyarylate, or an inner layer of biaxially oriented polyimide and an outer layer of polysulfone, and the like.

If desired, particulate organic or inorganic material may be utilized in the substrate member. The particulate material is dispersed in a continuous matrix of the substrate film forming polymer. Typical particulate organic or inorganic material include, for example, silica, glass, mica, calcium carbonate, clay, zinc stearate, calcium stearate, tin stearate, magnesium stearate, polytetrafluoroethylene (e.g., Polymist, available from Ausimont USA, Inc.), polyethylene (e.g. ACumist, available from Allied Signal Chemical), polypropylene (e.g. Micropro, available from Micro Powders, Inc.), fatty amides (oleamide, erucamide, stearamide, available from Synthetic Products, Inc.), polyvinylidene fluoride (e.g. Kynar, available from Pennwalt Chemicals Corporation), modified fluorocarbon (e.g. Synfluo, available from Micro Powders, Inc.), and the like are preferred for enhancing resistance of the substrate to abrasion. These particulate additives improve the frictional and wear properties of the substrate. The particles size of the particulate material is preferably between about 0.01 micrometer and about 10 micrometers and typically have an average particle size of about 5 micrometers. Generally, the substrate may contain up to about 30 percent by weight of the particulate material based on the total weight of the substrate.

If desired, any suitable thin adhesive layer may optionally be interposed between the conductive surface and the dielectric imaging layer. If such layers are utilized, they preferably have a dry thickness between about 0.01 micrometer and about 1 micrometer. Typical adhesive layers include film-forming polymers such as copolyester, polyvinylbutyral, polyvinylpyrolidone, polyurethane, polymethyl methacrylate and the like. Any suitable technique may be utilized to apply the adhesive layer. Typical application techniques include spraying, dip coating, roll coating, wire wound rod coating, and the like. The distortion forces applied by these extremely thin adhesive layers to the conductive surface of a relatively thick substrate layer has negligible effects and the beam rigidity of the relatively thick substrate layer will maintain its original shape.

Generally, the electrographic imaging member of this invention, comprising a flexible supporting substrate member, an optional thin electrically conductive layer, an optional thin adhesive layer and a relatively thick dielectric imaging layer, is substantially flat when placed as a sheet or web on a flat surface, Obviously, if the electrographic imaging member is give a belt shape, it cannot be flat when placed on a flat surface. However, any section of the belt will lie flat when supported on a flat surface. Any suitable electrically inactive dielectric material comprising film forming polymer may be employed in the relatively thick dielectric imaging layer of the electrographic imaging member of this invention. Typical film forming organic resinous polymers include polycarbonates, acrylate polymers, vinyl polymers, cellulose polymers, polyesters, polysiloxanes, polyamides, polysulfones, polyarylates, copolyesters, copolyester glycols, polyurethanes, polystyrenes, epoxies, and the like. Many organic resinous polymer are disclosed, for example, in U.S. Pat. No. 3,121,006 and U.S. Pat. No. 4,439,507, the entire disclosures of which are incorporated herein by reference. Organic resinous polymers may be block, random or alternating copolymers.

Generally, when a single relatively thick dielectric layer is utilized over a single substrate member (with or without a thin intervening electrically conductive layer) satisfactory results are achieved with a thickness of between about 10 micrometers and about 50 micrometers. Preferably, the dielectric layer has a thickness of between about 13 micrometers and about 40 micrometers. Optimum results can be obtained when the dielectric layer has a thickness of between about 16 micrometers and about 30 micrometers. When the dielectric layer is less than 10 micrometers, the imaging member will be subjected to unduly high fields during charging and become too sensitive to wear whereas when the dielectric layer is greater than about 50 micrometers, the imaging member will exhibit unacceptably low fields during development and the dielectric imaging layer thickness will induce greater surface bending stress and lead to premature dynamic fatigue dielectric imaging layer cracking when transported over small diameter belt supporting rollers, e.g. 19 mm diameter, during cycling.

The relatively thick dielectric imaging layer should be continuous, uniform and have a dielectric constant of between about 3 and about 10 for satisfactory electrographic imaging. The dielectric imaging layer should also have a bulk resistivity of at least about $10^{10}$ ohm cm at between about 5 percent to about 80 percent relative humidity and between about 16° C. (60° F.) and about 50° C. (122° F.) because charge movement on the surface of the imaging layer after imagewise discharge results in image blooming. Bulk resistivity below this level also causes charge decay through the dielectric imaging layer thereby decreasing the available image charge level for development.

The dielectric imaging layer should also be electrically inactive and incapable of supporting the injection of photo-generated holes and electrons or allowing the transport of these holes or electrons through the dielectric imaging layer to selectively discharge the imaging surface charge. The dielectric imaging layer should exhibit negligible, if any, discharge when exposed to a wavelength of light useful in xerography, e.g. 4000 Angstroms to 8000 Angstroms. Thus, the electrically inactive dielectric imaging layer is a substantially non-photoconductive material. The dielectric imaging layer in the electrographic imaging member of the instant invention is a material which is an electrical insulator to the extent that an electrostatic charge placed on the dielectric imaging layer is not conducted in either the presence or absence of illumination, i.e. a rate insufficient to prevent the formation and retention of an electrostatic latent image thereon.

Any suitable electrically inactive resin binder soluble in a suitable solvent may be employed in the dielectric imaging layers of this invention. Typical inactive resin binders soluble in solvents include polycarbonate resins such as poly(4,4'-isopropylidenediphenyl carbonate) and poly[1,1-cyclohexane bis(4-phenyl)carbonate], polystyrene resins, polyether carbonate resins, 4,4'-cyclohexylidene diphenyl polycarbonate, polyarylate, polystyrene, styrene acrylonitrile copolymer, polysulfone, polyacrylate, polyethylene terephthalate glycol (e.g. Kodar PETG, available from Eastman Chemical Products, Inc.) and polycyclohexylenedimethylene terephthalate glycol (e.g. Kodar PCTG available from Eastman Chemical Products, Inc.), copolyesters (e.g.

49000, available from E. I. duPont de Nemours & Company, or Vitel PE-100, Vitel PE-200, Vitel PE-307, Vitel PE-5545, Vitel PE-5571 or Vitel PE-5833, all Vitels being available from Goodyear Tire & Rubber), and the like and mixtures thereof. Molecular weights can vary from about 20,000 to about 1,500,000. Although solution application of dielectric imaging layers is preferred for coating webs, the thermoplastic film forming polymer may be applied by any other suitable technique.

Preferred dielectric imaging layers comprise an electrically inactive resin material such as a polycarbonate, polystyrene, polyether carbonate, copolyesters (e.g. 49000, available from E. I. duPont de Nemours & Company, or Vitel PE-100, Vitel PE-200, Vitel-307, Vitel PE-5545, Vitel PE-5571 or Vitel PE-5833, all Vitels being available from Goodyear Tire & Rubber), copolyester glycols such as polyethylene terephthalate glycol (e.g. Kodar PETG, available from Eastman Chemical Products, Inc.) and polycyclohexylenedimethylene terephthalate glycol (e.g. Kodar PCTG, available from Eastman Chemical Products, Inc.), and the like. If desired, the dielectric imaging layer may comprise multiple layers of the same or different dielectric materials. The most preferred electrically inactive resin material are polycarbonate resins have a molecular weight from about 20,000 to about 100,000, more preferably from about 50,000 to about 100,000. The materials most preferred as the electrically inactive resin material is poly(4,4'-dipropylidene-diphenylene carbonate) with a molecular weight of from about 35,000 to about 40,000 (available as Lexan 145 from general Electric Company); poly(4,4'-isopropylidene-diphenylene carbonate) with a molecular weight of from about 40,000 to about 45,000 (available as Lexan 141 from the General Electric Company); a polycarbonate resin having a molecular weight of from about 50,000 to about 100,000, (available as Makrolon from Farbenfabricken Bayer A.G.) and a polycarbonate resin having a molecular weight of from about 20,000 to about 50,000 (available as Merlon from Mobay Chemical Company). Methylene chloride solvent is a desirable component of the dielectric imaging layer coating mixture for adequate dissolving of all the components and for its low boiling point. Layers comprising such polycarbonate resins having a $T_g$ of about 158° C. have a thermal contraction coefficient between about $6\times10^{-5}$/° C. and about $7\times10^{-5}$/° C. Other preferred electrically inactive resin materials which are of particular interest include copolyesters (e.g. 49000, available from E. I. duPont de Nemours & Company, or Vitel PE-100, Vitel PE-200, Vitel PE-307, Vitel PE-5545, Vitel PE-5571 or Vitel PE-5833, all Vitels being available from Goodyear Tire & Rubber). These dielectric imaging layer materials have a thermal coefficient contraction of between about $1.5\times10^{-5}$° C. and about $2.2\times10^{-5}$/° C.

To enhance adhesion, it may be desirable to add an adhesive promoting polymer to the dielectric layer coating composition. Typical adhesive polymers include, for example, copolyesters (e.g. 49000, available from E. I. duPont de Nemours & Co. and Vitel PE-100 or Vitel PE-200 both available from Goodyear Tire and Rubber Co.); polyethylene terephthalate glycol (e.g. Kodar PETG, available from Eastman Chemical Products, Inc.); and the like. Generally the amount of adhesive added to the dielectric layer is less than about 10 percent by weight based on the total weight of the dielectric layer.

If desired, particulate organic or inorganic material may be utilized in the dielectric layer. The particulate material is dispersed in a continuous matrix of the dielectric film forming polymer. Typical particulate organic or inorganic material include, for example, silica, glass, mica, calcium carbonate, clay, zinc stearate, calcium stearate, tin stearate, magnesium stearate, polytetrafluoroethylene (e.g., Polymist, Ausimont USA, Inc.), polyethylene (e.g. ACumist, available from Allied Signal Chemical), polypropylene (e.g. Micropro, available from Micro Products, Inc.), fatty amides (oleamide, erucamide, stearamide, available from Synthetic Products, Inc.), polyvinylidene fluoride (e.g. Kynar, available from Pennwalt Chemicals Corporation), modified fluorocarbon (e.g. Synfluo, available from Micro powders, Inc.), and the like, are preferred for enhancing resistance of the dielectric layer to abrasion as well as reducing its coefficient of surface contact friction against cleaning blades thereby minimizing surface filming. These particulate additives improve the frictional and wear properties of the dielectric imaging layer. The particle size of the particulate material is preferably between about 0.01 micrometer and about 3 micrometers. Generally, the dielectric imaging layer may contain up to about 20 percent by weight of the particulate material based on the total weight of the imaging layer. The dielectric imaging layer should be free of any electrically active material such as electrically conductive, photoconductive, charge generating, charge transporting material or the like. Also the dielectric imaging layer should be free of any other photosensitive material such as silver halide used in photography and the like. Xerographic photoreceptors and photographic materials require expensive special shipping and storage treatment for protection from temperature extremes or fluctuations, exposure to sun light, contact with reactive fumes and the like. Moreover, special shutter systems, particularly automatic shutter systems, are required in xerographic machines to protect the photoreceptor when it is in use or when it is not in use. A photoconductive layer cannot be charged and developed in the presence of light. Further, photoreceptors are usually sensitive to heat and must be located a safe distance from fusers thereby limiting flexibility in machine architecture design. Also, photoreceptors are sensitive to toner filming. In addition, the coefficient of friction, surface energy and the like of photoreceptors materials, particularly the surface, cannot be readily tailored to accommodate different machine components such as blade cleaning systems. Moreover, cycle up and cycle down problems are a common characteristic of photoreceptors, Thus, the electrically inactive dielectric imaging materials employed in the electrographic imaging member of this invention exhibit many properties that are superior to those of electrically active or photographic materials.

Any suitable and conventional technique may be utilized to apply the dielectric imaging layer coating mixture to the supporting substrate member or electrically conductive layer, if a conductive layer is utilized. Typical application techniques include spraying, dip coating, roll coating, wire wound rod coating, extrusion coating and the like. Drying of the deposited coating may be effected by any suitable conventional technique such as oven drying, infra red radiation drying, air drying and the like. If desired, the dielectric layer may be formed first and the substrate layer can subsequently be applied to the substrate layer or some previously deposited layer such as an electrically conductive layer or an adhesive layer. This approach is particularly desirable when the dielectric layer is insoluble in solvents. Thus, for example, because polyethylene terephthalate (or polyimide) is insoluble in most organic solvents, the solution coating of polyethylene terephthalate onto a substrate is not feasible. An advantage of the present concept is that it offers an effective technique to fabricate a curl-free electrographic imaging member having a highly solvent resistant polyethylene terephthalate dielectric surface, by solution casting a polymeric layer having an equivalent thermal expansion coefficient, such as copolyesters e.g. 49000, available from E. I. duPont de Nemours & Company, or Vitel PE-100, Vitel PE-200, Vitel PE-307, Vitel PE-5545, Vitel PE-5571 or Vitel PE-5833, all Vitels being available from Goodyear Tire & Rubber Co.), copolyester glycols (e.g., polyethylene terephthalate glycol, Kodar PETG, or polycyclohexylenedimethylene terephthalate glycol, Kodar PCTG, available from Eastman Chemical Products, Inc.), onto a biaxially oriented polyethylene terephthalate substrate or a biaxially oriented polyimide substrate that has been coated with a thin electrically conductive layer.

An optional thin overcoat layer may, if desired, also be utilized to improve resistance to abrasion. These overcoating layers may comprise film forming polymers that are electrically insulating. Generally, the overcoatings are continuous and have a thickness of less than about 5 micrometers.

Proper selection of materials and thicknesses for the relatively thick layers utilized in the electrographic imaging member of this invention are important to the achievement of an imaging member that will lie flat on a flat surface, i.e. one that will be free of curls when a segment (e.g., section from a belt) of the imaging member is supported on a flat surface.

If an imaging web comprising a substrate of biaxially oriented polyethylene terephthalate, having a coefficient of thermal contraction of $1.7\times10^{-5}/°$ C., and a coating layer of polycarbonate (Makrolon), having a thickness of at least about 5 micrometers and a coefficient of thermal contraction of $6.5\times10^{-5}/°$ C. applied by solution coating, is normally flat at elevated temperatures during drying, the coated web will tend to curl toward the dielectric imaging layer upon cooling to ambient room temperature because the polycarbonate layer will contract to greater extent than the biaxially oriented polyethylene terephthalate layer. Thus, if this curled coated web is solution coated with another polycarbonate coating on the back side of the substrate and opposite to the polycarbonate imaging layer as the outer substrate layer, the requirement of heating to drive off the coating solvent at an elevated temperature will produce a counteracting contracting force after cooling to room temperature to balance the curling effect. If the applied polycarbonate outer substrate layer is of the same thickness as the polycarbonate imaging layer, the resulting flexible imaging member will lie flat on a flat surface.

If, instead of being subjected to the above described elevated temperature process, the flat biaxially oriented polyethylene terephthalate web is coated with a 50 percent by weight Makrolon and 50 percent by weight aromatic diamine solution at room temperature without the application of heat, the web tends to curl when the coating solvent evaporates due to the dimensional contraction of the applied coating from the point in time when the applied coating solidifies and adheres to the underlying surface. Once this solidification and adhesion point is reached, further evaporation of the coating solvent causes continued shrinking of the applied coating layer due to volume contraction resulting from removal of additional solvent will cause the coated web to curl toward the applied layer. This shrinking occurs isotropically, i.e., three-dimensionally. In other words, from the point in time when the applied coating has reached a solid state and is anchored at the interface with the underlying layer, continued shrinking of the applied coating causes dimensional changes in the applied coating which in turn builds up internal tension stress, and therefore, forces the entire coated structure to curl toward the applied coating. If the coated article has a circular shape, the curled structure will resemble that of a bowl. If placed in an oven and heated to about 90° C., this curled article will flatten because the $T_g$ of the applied coating is about 81° C. and the applied coating will liquefy and no longer exert any stress on the coated web. Moreover, if the liquefied coating is cooled to just above 81° C., the coating remains in a liquid state and flowable and still does not exert any stress on the underlying layer. However, this liquefied coating transforms rapidly into a solid coating at 81° C. and anchors itself to the underlying layer, Further cooling of this solid coating from 81° C. down to room temperature causes the applied coating to contract at about 3.5 to 4 times greater than that of the underlying biaxially oriented polyethylene terephthalate substrate layer so that the coated article will curl.

When a multilayered web to be coated is already curled toward the imaging layer at room temperature, on may coat the web with a uniform outer substrate coating on the back side of the inner substrate (i.e., on the side opposite that bearing the imaging layer) by placing the web under tension and over a backing roll to remove the curl across the width of the web during the coating operation. Alternatively, one may employ a vacuum platen to flatten the web. However, vacuum platens may be undesirable where thin webs are to be coated because the vacuum sources can cause dimples or other deformations to occur in the web during the coating operation.

If a multilayered web to be coated comprises a metallized biaxially oriented polyethylene terephthalate layer having a polycarbonate coating on the metallized side of the substrate and if such web curls at room temperature, one may apply an outer substrate layer coating to the exposed biaxially oriented polyethylene terephthalate surface of the web with a polycarbonate coating solution while the web is flattened across its width by applying tension to the web while the web is supported on a backing roll. If the thickness of the polycarbonate outer substrate layer (after elevated temperature drying followed by cooling to room temperature) is equal to that of the previously formed polycarbonate imaging layer, the resulting imaging member is flat.

Polycarbonate (e.g. Makrolon available from Farbenfabricken Bayer A.G.), that is substantially free of solvent has a glass transition temperature $T_g$ of about 158° C. and polycarbonate that contains residual solvent can, for example, have a $T_g$ of less than about 135° C. The coating and drying of this material can be effected at a temperature below the glass transition temperature of the polycarbonate layer of the web, i.e. below about 158° C. However, a web coated with a material which is dried at room temperature can curl to a greater degree than if drying were conducted at an elevated temperature because extensive shrinking can occur during room temperature drying after the solidification and adhesion point is reached due to the extent of volume contraction induced by removal of large amounts or remaining solvent. Whereas at an elevated drying temperature, most of the solvent is removed while the coating material is maintained above the $T_g$ which keeps the coating material in a flowable state and the residual solvent present in the coating functions as a plasticizer to lower the $T_g$ of the polycarbonate coating.

If there are only two relatively thick layers in the web and the thermal contraction coefficient of each of the layers are the same, then, preparation of the article with a single flat relatively thick preformed layer starting material will result in a flat final coated article.

If a preformed relatively thick layer is coated with an extremely thin layer of another material, the distortion forces applied by the extremely thin layer to the original thick layer has negligible effects and the original layer will tend to maintain its original shape. Generally, layers having a thickness of less than about 1 micrometer have substantially no significant effect on the curling of a relatively thick single layered or multilayered web. Thus, for example, thin adhesive layers or thin vacuum deposited metallic layers can be ignored as a factor affecting the curling of a web having a 76 micrometer thick substrate layer.

If a web is to contain three relatively thick layers and two adjacent layers are flat prior to application of the third layer because the coefficient of thermal contraction for each of the two layers are the same, the third layer to be applied must also have the same thermal coefficient of contraction as the other two to achieve a flat web.

If a web is to contain three relatively thick layers and two adjacent layers are curled prior to application of the third layer, then the third layer must apply compensating forces to one of the exposed layers of the original two layered article in order to achieve a flat web.

Thus, in a dual layered flat device, the linear tension force ($F_{t1}$) measured in any direction along the plane of dielectric imaging layer should be substantially small and less than the beam rigidity of the relatively thick underlying single layer substrate. Thus, the thermal contraction coefficient of the dielectric imaging layer is substantially the same as that of the single supporting substrate layer. Beam rigidity is defined as the elastic section modulus per inch width of the supporting substrate in resisting curling when subjected to a bending moment. The beam rigidity is calculated by multiplying the Young's modulus by moment of inertia of the substrate.

In a triple layered flat device, the linear tension force ($F_{t1}$) measured in any direction along the plane of a dielectric imaging layer should equal the linear tension force ($F_{t2}$) measured along the plane of the outermost layer (i.e. layer not in contact with the dielectric layer) if the substrate contains two relatively thick layers. In other words, the linear tension force $F_{t1}$ of the applied coating after drying should always be substantially equal to the linear tension force $F_{t2}$ of the opposite outer layer to achieve device flatness. If the thermal contraction coefficient of the dielectric imaging layer material is selected to approach the value of the thermal contraction coefficient of the inner substrate layer to effectively decrease the linear tension force $F_{t1}$, the thickness of the applied outer substrate layer must then be thin in order to produce a smaller linear tension force $F_{t2}$ sufficient to compensate $F_{t1}$ to yield a curl-free imaging device. In the event that the thermal contraction coefficients of both the dielectric imaging layer and the inner substrate layer are substantially matched, no outer substrate layer coating is needed, and the three-layered electrographic imaging member is thus reduced to a two-layered imaging device.

A relatively thick layer for a single layer substrate is defined herein as a layer having a thickness between about 25 micrometers and about 200 micrometers. A relatively thick dual-layered substrate having two relatively thick layers is defined herein as comprising an inner substrate layer having a thickness between about 25 micrometers and about 200 micrometers plus an outer substrate layer have a thickness between about 10 micrometers and about 50 micrometers.

The linear tension force ($F_{t1}$) measured in any direction along the plane of a relatively thick dielectric imaging layer may be determined using the following formula:

$$F_{t1}=(A_1)(M_1)[\Delta t_1(\epsilon_1-\epsilon_S)]$$

The linear tension force ($F_{t2}$) measured along the plane of the outermost layer (i.e. layer not in contact with the dielectric layer) if the substrate contains two relatively thick layers may be determined using the following formula:

$$F_{t2}=(A_2)(M_2)[\Delta t_2(\epsilon_2-\epsilon_S)]$$

wherein:

$A_1$ is the cross section of the dielectric imaging layer,
$A_2$ is the cross section of the outer substrate layer,
$M_1$ is Young's Modulus of the dielectric imaging layer,
$M_2$ is Young's Modulus of the outer substrate layer,
$\Delta t_1$ is the difference between ambient temperature and the highest processing temperature of the dielectric imaging layer,
$\Delta t_2$ is the difference between ambient temperature and the highest processing temperature of the outer substrate layer,
$\epsilon_1$ is the thermal coefficient of contraction of the dielectric imaging layer,
$\epsilon_S$ is the thermal coefficient of contraction of the inner substrate layer, and
$\epsilon_2$ is the thermal coefficient of contraction of the outer substrate layer.

Young's modulus is defined as the value of the slope in the linear regions of a stress-strain curve for a material. The linear region of the stress-strain curve characterizes the elastic limit of the material under stress. The material will instantaneously recover its original dimensions as soon as the imposed stress is removed. The Young's modulus value for any given layer may be determined by coating a free standing film of a layer on a Teflon surface, measuring the stress-stress relationship of a tensile sample cut from the film with an Instron mechanical tester and calculating the slope of the linear region of the stress-strain curve to arrive at the Young's modulus value of the layer.

Ambient temperature is defined as the normal room temperature which is about 25° C.

Highest processing temperature is defined as the maximum temperature a coating layer is exposed to during the fabrication processes.

The relatively thick layers employed in the imaging member of this invention have a substrate beam rigidity of between about $8.4\times10^{-4}$ lb-in$^2$ (2.5 grams-cm$^2$) and about $2.9\times10^{-3}$ lb-in$^2$ (8.8 grams-cm$^2$). Beam rigidity as used herein is defined as the elastic section modulus per inch width of the supporting substrate in resisting curling when subjected to a bending moment. The beam rigidity is calculated by multiplying the Young's modulus by the moment of inertia of the substrate. These relatively thick layers have a Young's modulus of between about $2.5\times10^5$ lbs/in$^2$ ($1.76\times10^4$ kg/cm$^2$) and about $7\times10^5$ lb/in$^2$ ($4.93\times10^4$ kg/cm$^2$).

The relatively thick layers in the imaging member of this invention should also comprise a film forming thermoplastic polymer having a $T_g \geqq 45°$ C. The film forming thermoplastic polymer should have a $T_g \geqq 45°$ C. in order to ensure material mechanical integrity during electrographic imaging processes because machine operational temperatures can occasionally reach a high temperature of about 45° C.

The linear tension force $F_{t1}$ measured in any direction along the plane of the dielectric imaging layer and the linear tension force $F_{t2}$ measured along the plane of the outer substrate layer in the same direction as the direction selected for measuring $F_{t1}$ in the dielectric imaging layer should be substantially the same and preferably less than about ±15 percent based on the linear tension force $F_{t1}$. When the difference exceeds about ±20 percent of the $F_{t1}$, the dried electrographic imaging member will curl. Greater differences between the linear tension forces $F_{t1}$ and $F_{t2}$ will result in a greater degree of imaging member curling.

The linear tension force ($F_{t1}$) measured in any direction along the plane of a dielectric imaging layer is substantially equal to the linear tension force ($F_{t2}$) measured along the plane of the outermost layer if the substrate contains two relatively thick layers when the dried coated article is flat. Thus, instead of actually measuring the linear tension force $F_{t1}$ of the applied coating after drying and the linear tension force $F_{t2}$ of the opposite outer layer, $F_{t1}$ can be made substantially equal to $F_{t2}$ by experimentally varying the thickness of the applied dielectric layer coating until the final dried article is flat. Similarly, $F_{t2}$ can also be made substantially equal to $F_{t1}$ by experimentally varying the thickness of the applied outer substrate layer coating until the final dried article is flat. The dielectric coating layer thickness can thereafter be repeated for web coating runs. However, if the multilayered substrate is the design objective and is also initially flat prior to coating, all the layers in the final coated article must have the same thermal contraction characteristics in order to achieve a flat flexible electrographic imaging member, in which the linear tension force ($F_{t1}$) measured in any direction along the plane of a dielectric imaging layer is substantially small and equal to the linear tension force ($F_{t2}$) measured along the plane of the outermost layer of the substrate. In this case, both $F_{t1}$ and $F_{t2}$ approach zero. The final dried dielectric imaging layer should also have a uniform thickness of between about 10 micrometers and about 50 micrometers for satisfactory electrographic images.

In a typical electrographic imaging member in which the dielectric imaging layer side of the imaging member contains a polycarbonate resin having a thickness range of from about 10 micrometers to about 50 micrometers, a polyethersulfone supporting substrate can provide mechanical and/or strength and rigidity to the device. Satisfactory results may be achieved when the polyethersulfone supporting substrate has a thickness range of between about 2.5 mils (64 micrometers) and about 8 mils (203 micrometers). More preferably, the polyethersulfone supporting substrate has a thickness range of between about 3 mils (76 micrometers) and about 6 mls (152 micrometers). For optimum mechanical performance and flatness, the polyethersulfone supporting substrate has a thickness range of between about 4 mls (102 micrometers) and about 5 mils (127 micrometers).

Typical combinations of supporting substrate and dielectric imaging layer materials exhibiting substantially the same thermal contraction coefficient include: biaxially oriented polyethylene terephthalate (e.g. Melinex 442, available from ICI Americas, Inc.) and copolyester (e.g. 49,000 available from E. I. duPont de Nemours & Co. or Vitel PE-100, Vitel PE-200, Vitel PE-307, Vitel PE-5545, Vitel PE-5571 or Vitel PE-4833, all Vitels being available from Goodyear Tire and Rubber Co.), polyethylene terephthalate glycol, (Kodar PETG, available from Eastman Chemical Products, Inc.) or polycylohexylenedimethylene terephthalate glycol (e.g. Kodar PCTG, available from Eastman Chemical Products, Inc.). Similar combinations of substrate and dielectric resin materials can be utilized as described to fabricate two-layered flat electrographic imaging members. Thus, instead of the biaxially oriented polyethylene terephthalate supporting substrate, a biaxially oriented polyimide substrate (Kapton, available from duPont De Nemours & Company, or Upilex, available from ICI Americans, Inc.) is substituted. Other combinations using polyethersulfone (e.g. Stabar S100 film available from ICI) and polycarbonate resin (e.g. Makrolon, available from Farbenfabricken Bayer A.G. or Lexan, available from general Electric Co., or polycyclohexylidene, available from Mitsubishi Chemicals), or polystyrene, or styrene acrylonitrile copolymer (e.g. Lustrex 4220 or Lustran SAN 31, available from Monsanto Polymer Products Company), or polyarylate or polysulfone (e.g. Ardel D-100 or Ultem, both available from Union Carbide) or polyetherimide (e.g. available from General Electric Co.). Still other similar combinations can also be achieved by replacing the polyether sulfone supporting substrate with either polycarbonate (e.g. Makrofol, available from Mobay Chemicals) or biaxially oriented polyvinyl fluoride (e.g. Tedlar, available from duPont de Nemours & Company), and the like where either layer may be utilized as the dielectric imaging layer an the other the supporting substrate. A thin vacuum deposited electrically conductive layer such a titanium, aluminum, gold, indium tin oxide, copper, nickel, zirconium, chromium, or combinations of metal layers, and the like having a typical thickness of about 200 angstroms may be used between the two layers. The addition of a small amount of inorganic or organic particles, for example, 5 percent by weight amino silane surface treated microcrystalline silica (available from Malvern Minerals Company), to the polymeric dielectric layers form filler reinforced films which increase each film's mechanical strength and wear resistance, Since the material structures described in the foregoing specific combinations consist of a thin titanium or other metallic layer sandwiched between two solvent resistant layers, each formulation offers the convenience of two dielectric layers, either of which may be utilized as the dielectric imaging layer for an electrographic imaging belt. This versatility is an important added benefit, particularly when one of the layers is not readily formed by solution coating. Alternatively, the vacuum deposited metal layer may be omitted and a layer formed from a film forming polymer loaded with a suitable conductive material such as carbon black, copper iodide, gold and other noble metals, platinum, polypyrrole, polyaromatic conducting polymers, polythiothenes, conducting metallic oxide such as antimony tin oxide, indium tin oxide, and the like may be utilized to function as a ground plane for the dielectric imaging layer.

The electrographic imaging member of this invention can reduce the number of coating layers required in the final imaging member product. The number of steps and costs for fabricating the electrographic imaging member of this invention is also reduced. Moreover, the rate of fabrication and product yield can be increased. In addition, electrographic imaging member deformation due to built-in internal stress is eliminated. Further, adhesion between the dielectric imaging layer and the supporting substrate is improved. The polyethersulfone, polycarbonate, biaxially oriented polyvinylfluoride, biaxially oriented polyethylene terephthalate and biaxially oriented polyimide substrates are capable of maintaining a high coefficient of surface contact friction against a belt module drive roll to ensure positive and reliable imaging member belt driving during machine operation. In addition, this invention reduces print defects by markedly extending the cycling resistance to curling of the electrographic imaging member. Also, the resulting stress/strain free dielectric imaging layers achieved with these materials combinations can enhance the dynamic mechanical life of the electrographic imaging member by eliminating the development of belt curling problem due to substrate layer wear during machine operation, thereby extending the service life of the electrographic imaging belt. All the imaging members fabricated using the present invention concept were seen to exhibit great resistance to the effect of solvent/stress surface cracking when used with a liquid development system. For example, in ink and ink solvent carrier compatibility tests of imaging member samples, having dielectric layers with and without filler reinforcement, by static bending of each imaging member sample over a 19 mm diameter roll while in constant contact with a cotton swab soaked with isopar mineral oil, magiesol and ink, neither solvent/stress surface cracking nor material degradation was observed for all the samples after two months of testing. This demonstrates good ink compatibility of all layers. By sandwiching a thin metallic ground plane between two polymeric layers, either of two functional surfaces are available for electrographic imaging.

A preferred electrographic imaging process of this invention comprises providing an ionographic imaging member comprising a flexible supporting substrate member and a dielectric imaging layer, the flexible supporting substrate member having a thermal contraction coefficient substantially identical to the thermal contraction coefficient of the dielectric imaging layer, the dielectric imaging layer having an imaging surface, uniformly depositing on the imaging surface an electrostatic charge of a first polarity, directing a stream of ions of a second polarity opposite the charge of the first polarity from a head electrically biased to the same polarity as the ions to discharge in image configuration the uniformly deposited charge of the first polarity thereby forming an electrostatic latent image on the imaging surface, and depositing electrostatically attractable marking particles on the imaging surface in conformance with the electrostatic latent image while simultaneously applying an electrical bias of the first polarity across the thickness of the dielectric layer and marking particle developer system.

Generally, the uniform charging of the ionographic imaging member is accomplished to achieve a potential between the ion projection head and the conductive layer of the ionographic imaging member of between about 1000 volts and about 4000 volts. The uniform charge on the dielectric member may account for between 5 percent and 100 percent of the potential. The dielectric imaging member may be uniformly charged by any suitable means. A typical charging means is a conventional corona charging element extensively utilized in xerographic imaging systems. Generally, satisfactory results may be achieved by uniformly charging the dielectric imaging layer to between about −50 volts and about −2000 volts. When the dielectric imaging layer is charged to less than about −50 volts, the charging systems are less able to provide a uniform charge level or to effectively erase the previous imagewise charge pattern. If the dielectric imaging layer is charged to more than about 100 volts per micrometer of thickness or exceeds its dielectric strength electrical breakdown may occur. If the voltage difference between the head and receptor exceeds the Paschen limit for the spacing between them, electrical breakdown can also occur.

Imagewise discharging of the uniformly charged imaging surface starting at a satisfactory level of about −1500 V with an ion stream should reduce the charge potential on the imaging surface to between about −1425 volts and about −500 volts to form an electrostatic latent image on the imaging surface having a difference in potential between background areas and image areas of between about 75 volts and about 1000 volts. Selection of surface potential depends on the biasing of suitable developer subsystems, with about 75 to about 600 volts for good development of the latent image on a dielectric imaging layer utilizing electrophoretic, conductive magnetic brush, or single component development and with about 250 to about 1000 volts for good development of the latent image on a dielectric imaging layer utilizing two component development with insulating carriers. Any suitable non-fluid assisted or fluid assisted ion projection printing head may be utilized to imagewise discharge the uniformly charged dielectric imaging layer. Ion projection printing heads are well known in the art. Typical non-fluid assisted ion projection printing heads are described, for example, in U.S. Pat. No. 3,976,484, U.S. Pat. No. 4,143,965, U.S. Pat. No. 4,137,537, U.S. Pat. No. 4,168,974, and U.S. Pat. No. 4,494,129, the entire disclosures or these patents being incorporated herein by reference. Typical fluid assisted ion projection printing heads are described, for example, in U.S. Pat. No. 4,644,373 to N. Sheridon and G. Sander, U.S. Pat. No. 4,463,363 to R. Gundlach and R. Bergen and U.S. Pat. No. 4,524,371 to N. Sheridon and M. Berkovitz, the entire disclosures of these patents being incorporated herein by reference. Fluid assisted ion projection printing heads are preferred because they do not come into physical contact with the electrographic imaging member which can cause wear and damage as stylus systems can. Further, fluid assisted ion projection is more efficient and can produce higher resolution images because non fluid assisted systems utilize screens or apertures which restrict ion flow to certain regions of the receptor. As previously described, in a typical fluid assisted ion projection printing head, pressurized air is moved through an ion generation chamber for entraining ions generated in the ion generation chamber and for transporting them through an exit channel or slit including an ion modulation region for subsequent deposition upon the uniformly charged dielectric imaging layer. Generally, the pressurized air is under a pressure of between about 1 inch of water and about 10 inches of water, and preferably between about 3.5 to about 7 inches of water prior to introduction into the ion generation chamber. A corona wire is mounted in the ion generation chamber and high electrical fields are established between the mounted corona wire, maintained at from about 2000 volts to about 6000 volts DC, and the conductive walls of the ion generation chamber. Because the voltage on the corona wire needed to maintain the corona is dependent on the spacing and geometry of the wire and the ion generation chamber, the preferred embodiment is to maintain this voltage by applying a constant current source of about from 0.8 to 2.0 milliamps to the wire. A bias potential of from 0 volts to about 1500 volts DC may be applied to the conductive walls of the ion generation chamber, the polarity of the reference voltage being the same as that of the polarity of the potential applied to the corona wire. As the ions are swept into the exit slit the ion stream is modulated by individually switchable modulation electrodes in thin film element layer, each connected to a voltage source of from about 10 volts to about 400 volts DC, the polarity of the applied potential being chosen to deflect the ions toward or away from the modulation electrodes. The distance between the thin film element layer and cavity wall at the closest point can be between about 76 micrometers (3 mils) and about 203 micrometers (8 mils) to provide satisfactory resolution at a reasonable rate of power consumption. Since image resolution depends upon the spots per inch of charge projected to the receiver to produce the electrostatic latent image, the ion streams should be controlled and modulated to less than the spot width. For example, 2700 volts can be employed for a 635 micrometer (0.025 inch) exit slit gap to prevent charge spreading as ions traverse the space between the fluid assisted ion projection printing head and the receiver surface. For the channel widths of this magnitude, laminar flow conditions will prevail with the air velocities between about 0.3 CFM and about 3 CFM and preferably between about 1 CFM to about 2.1 CFM. A high potential electrical source between about 0 volts to about 1500 volts DC of a sign opposite to that of the corona potential may be applied to metal layer underlying the dielectric imaging layer. Generally, the fluid assisted ion projection printing head should be spaced from about 150 micrometers and about 1500 micrometers from the imaging surface of the dielectric imaging layer. If the head is too close to the imaging surface, Paschen breakdown occurs and the imaging surface discharges. Although one polarity of charging and discharging has been described here, this invention may equally well be used with all polarities reversed, and/or with development systems utilizing charged or discharged area development with well known choices of development bias and materials.

The electrostatic latent image is then developed with electrostatically attractable marking particles to form a marking particle image corresponding to the electrostatic latent image. The developing (toning) step may be identical to that conventionally used in xerographic imaging. The electrostatically attractable marking particles may be applied, for example, to the electrostatic latent image on a receiver precharged to about −1500 V and imaged to about −650 V with a developer applicator while supplying a bias potential to the developer applicator of between about −1450 volts and about −1300 volts whereby the marking particles deposit on the imaging surface in image configuration to form a marking particle image. Generally, the minimum surface voltage of the image to be developed should be at least about 250 volts when insulating to-component developers are employed and about 75 volts when conductive two-component developers or when single component development systems are used. Conductive single or two-component developers as mentioned here are systems which tend to develop until the electric field above the toned latent image is neutralized while insulating two-component developers systems tend to develop less than 50 percent of the electric field above the latent image.

Any suitable conventional xerographic dry or liquid developer containing electrostatically attractable marking particles may be employed to develop the electrostatic latent image on the electroreceptor of this invention. The imaging member of this invention may be developed with suitable dry two-component developers containing electrically insulating carrier particles. Two-component developers comprise marking (toner) particles and carrier particles. Typical toner particles may be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl ester such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methyacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are generally present in an amount of from about 30 to about 99 percent by weight of the toner composition, although they may be present in greater or lesser amounts, provided that the objectives of the invention are achieved.

Any suitable pigment or dyes may be employed in the toner particles. Typical pigments or dyes include carbon black, nigrosine dye, aniline blue, magnetites, and mixtures thereof, with carbon black being the preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles may be present provided that the objectives of the present invention are achieved.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the color index as CI 60710, CI Dispersed Red 15, a diazo dye identified in the color index as CI 26050, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the color index as CI 69810, Special Blue X-2137, and the like. Illustrative examples of yellow pigments that may be selected include diarylide yellow 3,3-dichlorobenzidene acetoacentanilides, a monoazo pigment identified in the color index as CI 12700, CI Solvent Yellow 16, a nitrophenyl amine sulfonamide identified in the color index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. These color pigments are generally present in an amount of from about 15 weight percent to about 20.5 weight percent based on the weight of the toner resin particles, although lesser or greater amounts may be present provided that the objectives of the present invention are met.

When the pigment particles are magnetites, which comprise a mixture of iron oxides ($Fe_3O_4$) such as those commercially available as Mapico Black from Columbian Division, Cities Services, Inc., Akron, Ohio, these pigments are present in the toner composition in an amount of from about 10 percent by weight to about 70 percent by weight, and preferably in an amount of from about 20 percent by weight to about 50 percent by weight, although they may be present in greater or lesser amounts, provided that the objectives of the invention are achieved.

The toner compositions may be prepared by any suitable method. For example, the components of the dry toner particles may be mixed in a ball mill, to which steel beads for agitation are added in an amount of approximately five times the weight of the toner. The ball mill may be operated at about 120 feet per minute for about 30 minutes, after which time the steel beads are removed. Dry toner particles for two-component developers generally have an average particle size between about 8 micrometers and about 15 micrometers. Typical dry toners for two-component developers are disclosed, for example, in U.S. Pat. No. 2,788,288, U.S. Pat. No. 3,079,342 and U.S. Pat. No. Reissue 25,136, the disclosures of which are incorporated herein in their entirety. Dry toner particles for single component developers generally have an average particle size of between about 6 micrometers and 25 micrometers. Typical toners for single toner developers include, for example, Xerox 1012 Toner for the Xerox 1012 machine and Canon NP 3000 Toner or Canon universal toner for the Canon NP-210, NP-300, NP-400, and NP-500 machines.

Any suitable external additives may also be utilized with the dry toner particles. The amounts of external additives are measured in terms of percentage by weight of the toner composition, but are not themselves included when calculating the percentage composition of the toner. For example, a toner composition containing a resin, a pigment, and an external additive may comprise 80 percent by weight resin and 20 percent by weight pigment; the amount of external additive present is reported in terms of its percent by weight of the combined resin and pigment. External additives may include any additives suitable for use in electrostatographic toners, including straight silica, colloidal silica (e.g. Aerosil R972®, available from Degussa, Inc.), ferric oxide, unilin, polypropylene waxes, polymethylmethacrylate, zinc stearate, chromium oxide, aluminum oxide, stearic acid, polyvinylidene fluoride (e.g. Kynar®, available from Pennwalt Chemicals Corporation), and the like. Eternal additives may be present in any suitable amount, provided that the objectives of the present invention are achieved.

Any suitable carrier particles may be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles may vary, but are generally from about 50 microns to about 1,000 microns, thus allowing the particles to possess sufficient density and inertia to avoid adherence to the electrostatic images during the development process. Carrier particles may possess coated surfaces. Typical coating materials include polymers and terpolymers, including, for example, fluoropolymers such as polyvinylidene fluorides as disclosed in U.S. Pat. No. 3,526,533; 3,849,186; and 3,942,979, the entire disclosures of which are incorporated herein by reference. The toner may be present, for example, in the two-component developer in an amount equal to about 1 to about 5 percent by weight of the carrier, and preferably is equal to about 3 percent by weight of the carrier. The carrier, either coated or uncoated, may have an electrically insulating or electrically conductive outer surface.

If desired development may be effected with any suitable liquid developer. Liquid developers are disclosed, for example, in U.S. Pat. No. 2,890,174 and U.S. Pat. No. 2,899,335, the disclosures of these patents being incorporated herein in their entirety. Typical liquid developers may comprise aqueous based or oil based inks. This includes both inks containing a water or oil soluble dye substance and pigmented inks. Typical dye substances include Methylene Blue, commercially available from Eastman Kodak Company, Brilliant Yellow, commercially available from the Harlaco Chemical Co., potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition may comprise a finely divided opaque powder, a high resistance liquid and an ingredient to prevent agglomeration. Typical high resistance liquids include organic dielectric liquids such as Isopar, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols; cellulosics such as sodium carboxyethylcellulose, hydroxypropylmethyl cellulose, hydroxyethyl cellulose, methyl cellulose, cellulose derivatives such as esters and ethers thereof; alkali soluble proteins, casein, gelatin; acrylate salts such as ammonium polyacrylate, sodium polyacrylate; and the like.

Any suitable conventional xerographic development technique may be utilized to deposit toner particles on the electrostatic latent image on the imaging surface of the dielectric imaging members of this invention. Well known xerographic development techniques include, magnetic brush, cascade, powder cloud, liquid and the like development processes. Magnetic brush development is more fully described, for example, in U.S. Pat. No. 2,791,949, cascade development is more fully described, for example, in U.S. Pat. No. 2,618,551 and U.S. Pat. No. 2,618,552, powder cloud development is more fully described, for example, in U.S. Pat. No. 2,725,305 and U.S. Pat. No. 2,918,910, and U.S. Pat. No. 3,015,305, and liquid development is more fully described, for example, in U.S. Pat. No. 3,084,043. All of these toner, developer and development technique patents are incorporated herein in their entirety.

When a magnetic brush developer applicator is employed for development, the development subsystem employed to apply the developer to the imaging surface of this invention is preferably run at a greater speed than one utilized for high charge xerographic systems. Thus, the direction of rotation of developer applicator rolls is preferably concurrent with the electroceptor direction and the surface speed is about 3 to about 6 times the speed of the electroreceptor with optimum between about 4 and about 5 times the electroreceptor speed. This compares to a surface speed for developer applicator rolls of 2 to 3 times that of a photoreceptor in common usage for nominal charge light and lens xerographic systems. The higher ratio compensates for the lower charge density in the latent image from the ion projection head and provides more toner per unit time in the development zone. Although developability is equivalent in both cases of with and against development roll directions for these higher speed ratios, some bead loss and scavenging can occur if the developer roll is run in the direction counter to the electroceptor direction. When it is desired that the developed image comprise an image developed corresponding to the area of charge, it is generally preferred to pass in contact therewith a developer which is triboelectrically charged to a polarity opposite to the retained charge of the latent image whereby the developer is attracted and adheres to the charged areas of the insulative image pattern. However, when it is preferred that a developed image corresponding to the uncharged (discharged) areas be reproduced, it is the general practice to employ developer charged to the same polarity as the image charge pattern. The developer will then be repelled by the charges of the latent image and will deposit on the non-charged (discharged) areas of the imaging member with the charged areas remaining absent of developer.

Image density is enhanced by the use of a development electrode. Development electrodes are widely used in the field of electrophotography. Depending upon the particular development technique employed, the development electrode may exist as part of the developer applicator or as a separate electrode closely spaced from the imaging surface of the dielectric imaging layer. For example, the development electrode may be a cylindrical applicator for applying two-component magnetic developer to the electrostatic latent image on the imaging surface of the dielectric imaging layer. The development electrode may be of any suitable shape. Typical development electrode shapes include cylinders, flat and arcuate plates, segmented flat and arcuate plates, and the like. Satisfactory results may be achieved with a development electrode to dielectric imaging layer surface distance of between about 250 and about 2500 micrometers for dry two-component developers and of between 75 and 1000 micrometers for single component development systems. The lower limit for dry two-component developers is limited by the bead size and the magnetic brush rigidity. The upper limit is determined by the ratio of the dielectric thicknesses of the development zone and the electroreceptor such that the electrode is effective in bringing the field into the region between the development electrode and the surface of the receptor. For single component development systems, the separation limits are set by the size of the toner for contact systems and by the height of the projected toner for jumping and cloud type systems. A high potential electrical source of between about 40 volts DC and about 300 volts DC of a sign opposite to that of the corona potential, may be applied to the development electrode to achieve satisfactory image density. The lower limit of the developer bias is set by the tendency of some development systems to deposit toner in the background areas of the images when the reverse or cleaning field is below about 40 V above the background voltage. The upper limit is determined by the loss of developability caused by decreasing the contrast voltage available.

Any suitable means may be used to transfer the developed image from the surface of the imaging member to the transfer or copy sheet representing the final copy. A particularly useful and generally preferred method of carrying out the transfer operation comprises an electrostatic transfer technique wherein a transfer sheet is placed in contact with the image bearing surface and an electric charge applied to the reverse side of the transfer sheet by, for example, an adjacent ion source such as a corona discharge electrode or other similar device placed in juxtaposition to the transfer member. Such an ion source may be similar to the source employed during a charging step of a conventional xerographic imaging process and is maintained at a high electrical potential with respect to the image bearing imaging member. Corona discharge results in the deposition on the transfer sheet of ionized particles which serve to charge the sheet. The transfer sheet will be charged to a polarity opposite to that of the developed image and such charge is strong enough to overcome the potential initially applied to the surface of the imaging member. A single wire corotron having applied thereto a potential of between about 3000 and about 7000 volts provides satisfactory transfer. Adhesive pick off is another form of image transfer that may be used. The electrostatic transfer process is preferred in order to obtain maximum image transfer while retaining high image resolution. When liquid developers are employed a more generally preferred method of image transfer is that of applying contact pressure when the transfer sheet is brought into surface contact with the developed image.

Any suitable material may be used as the transfer or receiving sheet for the developed image during the imaging process. The copy material may be insulating in nature or partially conductive. Typical materials are polyethylene, polyvinylchloride, polyvinyl fluoride, polypropylene, polyethylene terephthalate, ordinary bond paper, and the like.

The image transferred to the surface of the transfer or receiving sheet may be fixed to its support by any suitable means such as vapor fusing, heated roll fusing, flash fusing, oven fusing, lamination and the like. It is preferred to use the heat fixing technique in conjunction with toner developed images inasmuch as it allows for a high degree of control of the fixing phase of the process. When liquid developers are used, fixing is achieved by allowing for the evaporation of the relatively volatile carrier fluids utilized. Thus, the fixing step may be identical to that conventionally used in xerographic imaging.

The imaging member may optionally be erased by any suitable technique such as exposing the imaging surface to AC corona discharge to neutralize any residual charge on the imaging member. Typical potentials applied to an AC corona erasing device range from plus and minus about 3000 volts and about 6000 volts.

If desired, the imaging surface of the imaging member may be cleaned. Any suitable cleaning step that is conventionally used in xerographic imaging may be employed for cleaning the imaging member of this invention. Typical, well known xerographic cleaning techniques include brush cleaning, web cleaning, blade cleaning, and the like.

After transfer of the deposited toner image from the imaging member to a receiving member, the imaging member may, with or without erase and cleaning steps, be cycled through additional electrostatic latent image forming, development and transfer steps to prepare additional imaged receiving members.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An electrographic imaging member was prepared by providing a 76 micrometers (3-mil) thick biaxially oriented polyethylene terephthalate substrate web (Melinex 442, available from ICI) vacuum coated with a thin layer of titanium (200 angstroms) and gravure roll coating on the titanium side of the web with a thin layer of copolyester (49000, available from E. I. duPont de Nemours & Co.) using a solution of copolyester, 0.5 percent by weight solids, in a 70:30 volume ratio of tetrahydrofuran/cyclohexane. After drying at 135° C. for about 5 minutes, the adhesive layer had a thickness of about 500 angstroms. The dried adhesive layer was then overcoated with a polycarbonate (Makrolon 5705, available from Farbenfabricken Bayer A.G.) dielectric imaging layer by extrusion coating using a 10 percent by weight solids in methylene solution. The polycarbonate dielectric imaging layer had a thickness of about 18 micrometers after drying at 135° C. for about 5 minutes. An outer substrate coating was prepared by combining 9.9 percent by weight polycarbonate resin (Makrolon 5705, available from Farbenfabricken Bayer AG), 0.1 percent by weight copolyester resin (Vitel PE-100, available from Goodyear Tire and Rubber Co.) and 90 percent by weight of methylene chloride in a corboy container to form a coating solution containing 10 percent solids. The container was covered tightly and placed on a roll mill for about 24 hours until the polycarbonate and copolyester were dissolved in the methylene chloride. The outer substrate layer coating solution was applied to the rear surface (side opposite the titanium layer) of the electrographic imaging member by extrusion coating and dried at 135° C. for about 5 minutes to produce a dried outer substrate layer having a thickness of 18 micrometers. The shape of the resulting electrographic imaging member was flat. Since both the dielectric imaging layer and the outer substrate layer were fabricated using polycarbonate, which has a Young's modulus of $3\times10^5$ lbs/in$^2$ (or $2.1\times10^4$ Kg/cm$^2$) and a thermal contraction coefficient of $6.5\times10^{-5}$/° C., the linear tension force calculated (against the thermal contraction coefficient of the biaxially oriented polyethylene terephthalate of $1.7\times10^{-5}$/° C.) for $F_{t1}$ is equal to $F_{t2}$ which is equal to 1.1228 pounds per inch imaging member width or 200.7 grams per centimeter width of the imaging member.

EXAMPLE II

An electrographic imaging member was fabricated by following the same procedures and using the same materials as described in Example I, except that the thickness of both the dried dielectric imaging layer and outer substrate layer were 12 micrometers. The calculated linear tension force was $F_{t1}=F_{t2}=0.7485$ pounds per inch width imaging member or 133.8 grams per centimeter of imaging member width. The imaging member was flat.

EXAMPLE III

An electrographic imaging member was fabricated by following the same procedures and using the same materials as described in Example I, except that the thickness of both the dielectric imaging layer and outer substrate layer were 10 micrometers. The calculated linear tension force was $F_{t1}=F_{t2}=0.5614$ pound per inch width imaging member or 100.3 grams per centimeter of imaging member width. The imaging member was flat.

EXAMPLE IV

An electrographic imaging member was fabricated by following the same procedures and using the same materials as described in Example I, except that the polycarbonate dielectric imaging layer was replaced by hand coating a 10 percent by weight solids mixture of polyarylate (Ardel D-100, available from Union Carbide) in methylene chloride, with a 5-mil gap Bird applicator. The polyarylate dielectric imaging layer had a thickness of 18 micrometers after drying at 135° C. for about 5 minutes. The imaging member was flat.

The thermal contraction coefficient for the polyarylate dielectric imaging layer, at $6.6\times10^{-5}$/° C., is equivalent to the thermal contraction coefficient of the polycarbonate outer substrate layer. Since the Young's modulus of the polyarylate dielectric imaging layer is substantially the same as that of the polycarbonate outer substrate layer, the thickness of the polycarbonate outer substrate layer required to maintain imaging member flatness is essentially the same as that of the polyarylate dielectric layer. The linear tension force was $F_{t1}=F_{t2}=1.1288$ pounds per inch imaging member width of 200.7 grams per centimeter width of imaging member.

EXAMPLE V

An electrographic imaging member was fabricated by following the same procedures and using the same materials as described in Example I, except that styrene acrylonitrile copolymer (Lustran SAN 31, available from Monsanto Polymer Products Company) was substituted for the polycarbonate outer substrate layer and the processing temperature used for both the polycarbonate dielectric imaging layer and the styrene acrylonitrile copolymer outer substrate layer was 110° C. instead of 135° C.

Since the styrene acrylonitrile copolymer outer substrate layer had a thermal contraction coefficient of $6.77\times10^{-5}$/° C., which was about equivalent to that of the polycarbonate dielectric imaging but with a Young's modulus value of about 1.5 times greater than that of the polycarbonate dielectric imaging layer, a styrene acrylonitrile copolymer outer substrate layer thickness of only 11.8 micrometers was required to maintain imaging member flatness. The calculated linear tension force was $F_{t1}=F_{t2}=0.9149$ pound per inch imaging member width or 163.5 grams per centimeter width of imaging member.

EXAMPLE VI

An electrographic imaging member was fabricated using the same procedures and identical materials as described in Example I, except a 76 micrometer (3-mil) thick polyether ether ketone web (Stabar K200, available from ICI Americas, Inc.) was substituted for the biaxially oriented polyethylene terephthalate web. This flexible electrographic imaging member had a flat configuration.

Since the both the dielectric imaging layer and the outer substrate layer were fabricated using polycarbonate, the linear tension force calculated based on the thermal contraction mismatch between the polycarbonate and the polyether ether ketone, which has a thermal contraction coefficient of $4\times10^{-5}$/° C., was $F_{t1}=F_{t2}=0.5848$ pound per inch of the imaging member or 104.5 grams per centimeter of the imaging member width.

EXAMPLE VII

An electrographic imaging member ws prepared by providing a 76 micrometer (3-mil) thick biaxially oriented polyethylene terephthalate web (Melinex 442, available from ICI, Americas, Inc.) vacuum coated with a thin layer of titanium (200 angstroms) and hand coated on the titanium side with 4-mil gap Bird applicator using an 8 percent by weight of copolyester (49000, available from E. I. duPont de Nemours & Co.) and 2 percent by weight of a crosslinker (Mondur CB-75, available from Mobay Chemical) solution in methylene chloride. The web coating was dried at 135° C. in a forced air oven for 5 minutes. The crosslinker was added to eliminate tackiness on the dry dielectric imaging layer and avoid blocking. The resulting dielectric layer had a dry thickness of about 16 micrometers. Since the thermal contraction coefficients of the dielectric imaging layer and the substrate were substantially the same, the linear tension force $F_{t1}$ approached zero and this flexible electrographic imaging member therefore had a flat configuration.

EXAMPLE VIII

Four electrographic imaging members were fabricated using the same procedures and materials as described in Example VII, except that the copolyester (49000, available from E. I. duPont de Nemours & Co.) dielectric imaging layer was replaced by the following copolyester resins Vitel PE-307, Vitel PE-5545, Vitel PE-5571 and Vitel PE-5833, all available from Goodyear Tire & Rubber Company. The thickness of the resulting crosslinked dry dielectric imaging layer of each of the different electrographic imaging members was about 16 micrometers. Since the thermal contraction coefficients of each of the dielectric imaging layers and the underlying substrate were substantially the same, the linear tension force $F_{t1}$ approached zero and each of these flexible electrographic imaging members had a flat configuration.

EXAMPLE IX

An electrographic imaging member was fabricated by using the same procedures and identical materials as described in Example VII, except a copolyester resin (Vitel PE-100, available from Goodyear Tire and Rubber Co.) was substituted for the copolyester (49000, available from E. I. duPont de Nemours & Co.) dielectric layer. No crosslinker was added to the coating solution. The resulting dielectric layer had a dry thickness of about 16 micrometers. Since the thermal contraction coefficients of the dielectric imaging layer and the substrate were substantially the same, the linear tension force $F_{t1}$ approached zero and this flexible electrographic imaging member therefore had a flat configuration.

EXAMPLE X n electrographic imaging member was fabricated by using the same procedures and identical materials as described in Example VII, except a copolyester resin (Vitel PE-200, available from Goodyear Tire and Rubber Co.) was substituted for the copolyester (49000, available from E. I. duPont de Nemours & Co.) dielectric layer. No crosslinker was added to the coating solution. The resulting dielectric layer had a dry thickness of about 16 micrometers. Since the thermal contraction coefficients of the dielectric imaging layer and the substrate were substantially the same, the linear tension force $F_{t1}$ approached zero and this flexible electrographic imaging member was therefore free of any curls.

EXAMPLE XI

An electrographic imaging members was were fabricated using the same procedures and identical materials as described in Example VII a copolyester resin of polyethylene terephthalate glycol (Kodar PETG, available from Eastman Chemical Products, Inc.) was substituted for the copolyester (49000, available from E. I. duPont de Nemours & Co.) dielectric layer. No crosslinker was added to the coating solution. The resulting dielectric layer had a dry thickness of about 16 micrometers. Since the thermal contraction coefficients of the dielectric imaging layer and the substrate were substantially the same, the linear tension force $F_{t1}$ approached zero and this flexible electrographic imaging member therefore had a flat configuration.

EXAMPLE XII

Electrographic imaging members were fabricated using the same procedures and identical materials as described in Examples VII to XI, except a 76 micrometer (3-mil) thick biaxially oriented polyimide web (Kapton, available from E. I. duPont de Nemours & Co.) was substituted for the biaxially oriented polyethylene terephthalate web. Since the thermal contraction coefficient of the biaxially oriented polyimide was substantially the same as that of the biaxially oriented polyethylene terephthalate, all the flexible electrographic imaging members fabricated by substrate replacement were flat.

EXAMPLE XIII

An electrographic imaging member was prepared by providing a 102 micrometers (4-mil) thick polyether sulfone web (Stabar S100, available from ICI) vacuum coated with a thin layer of titanium (200 angstroms) and hand coated on the titanium side with 4-mil gap Bird applicator using a 10 percent by weight solution of 9.9 grams polycarbonate (Makrolon, available from Farbenfabricken Bayer A.G.) and 0.1 gram copolyester adhesion promoter (Vitel PE-100, available from Goodyear Tire and Rubber Co.) dissolved in 90 grams methylene chloride. The web coating was dried at 135° C. in a forced air oven for 5 minutes. The resulting dielectric layer had a dry thickness of about 16 micrometers. Since the thermal contraction coefficient of the polyether sulfone substrate, at $6.0\times10^{-5}/°$ C., was about the same as that of the polycarbonate dielectric imaging layer, the linear tension force $F_{t1}$ approached zero and this flexible electrographic imaging member was therefore free of any curls.

EXAMPLE XIV

An electrographic imaging member was fabricated using the same procedures and identical materials as described in Example XIII, except that 4,4'-cyclohexylidene polycarbonate was substituted for the polycarbonate (Makrolon) and tetrhydrofuran replaced the methylene chloride solvent. The resulting dielectric layer had a dry thickness of about 16 micrometers. This flexible electrographic imaging member was free of any curls.

EXAMPLE XV

An electrographic imaging member was fabricated using the same procedures and identical materials as describe din Example XIII, except that polystyrene (Lustrex 4220, available from Monsanto Polymer Products Company) was substituted for the polycarbonate (Makrolon). The resulting dielectric layer had a dry thickness of about 16 micrometers.

Since the thermal contraction coefficient of the dielectric imaging layer matched that of the substrate, the linear tension force $F_{t1}$ was, therefore, equal to zero and this flexible electrographic imaging member was free of any curls.

EXAMPLE XVI

An electrographic imaging member was fabricated using the same procedures and identical materials as described in example XIII, except that polysulfone (Ultem, available from Union Carbide) was substituted for the polycarbonate (Makrolon). The resulting dielectric layer had a dry thickness of about 16 micrometers. Since the thermal contraction coefficient of the dielectric imaging layer matched that of the substrate, the linear tension force $F_{t1}$ approached zero and this flexible electrographic imaging member was free of any curls.

EXAMPLE XVII

An electrographic imaging member was fabricated using the same procedures and identical materials as described in Example XIII, except that polyarylate (Ardel D-100, available from Union Carbide), was substituted for the polycarbonate (Makrolon). The resulting dielectric layer had a dry thickness of 16 micrometers. Since the thermal contraction coefficient of the dielectric imaging layer matched that of the substrate, the linear tension force $F_{t1}$ was, therefore, equal to zero and this flexible electrographic imaging member was free of any curls.

EXAMPLE XVIII

An electrographic imaging member was fabricated using the same procedures and identical materials as described in Example XIII, except that polyetherimide available from General Electric Co. was substituted for the polycarbonate (Makrolon). The resulting dielectric layer had a dry thickness of about 16 micrometers. Since the thermal contraction coefficient of the dielectric imaging layer matched that of the substrate, the linear tension force $F_{t1}$ was, therefore, equal to zero and this flexible electrographic imaging member was free of any curls.

EXAMPLE XIX

An electrographic imaging member was fabricated using the same procedures and identical materials as described in Example XIII, except that styrene acrylonitrile copolymer (Lustran SAN 31, available from Monsanto Polymer Products Company) was used to replace the polycarbonate (Makrolon) dielectric imaging layer. The dry thickness of the resulting styrene acrylonitrile layer was about 16 micrometers. Since the thermal coefficient of the dielectric imaging layer matched that of the substrate, the linear tension force $F_{t1}$, therefore, approached zero and the fabricated electrographic imaging member was flat.

EXAMPLE XX

Electrographic imaging members were fabricated using the same procedures and identical materials as described in Examples XIII to XIX, except that the 4-mil polyether sulfone substrate was replaced by polycarbonate (Makrofol, available from Mobay Chemical) or polyvinyl fluoride (Tedlar, available from duPont de Nemours & Company). Since the thermal contraction coefficient of the polycarbonate as well as polyvinyl fluoride was substantially the same as that of the polyether sulfone substrate, all the resulting electrographic imaging members fabricated with the substituted substrates were flat.

EXAMPLE XXI

The coated dielectric layers of Examples I through XX were evaluated for their bond strength adhesion to the supporting substrate by an adhesive tape peel test. To prepare the sample for adhesion determination, a cross-hatched pattern was formed on each dielectric layer by cutting through the entire thickness of the dielectric layers with a razor blade. The cross hatched pattern consisted of perpendicular slices 5 mm apart to form tiny squares in the electrically conductive metal layers. A tape peel test was conducted with two different adhesive tapes; one was Scotch Brand Magic Tape No. 810 available from 3M Corporation, having a width of 0.75 inch and the other was Fas Tape No. 445, available from Fasson Industrial Division, Avery International. The adhesive tapes of each manufacturer were pressed onto every group strip layer test sample. After application of the tapes, the tape of each brand was peeled at a 90° angle from the surface of the dielectric layer. Peeling off the tapes from the electrophotographic imaging member failed to remove any of the cross-hatched pattern from any underlying layer, indicating good bonding strength had been formed between the dielectric layer and the metallized supporting substrate.

EXAMPLE XXII

An electrographic imaging members was prepared by providing a 76 micrometer (3-mil) thick biaxially oriented polyethylene terephthalate web (Melinex 442, available from ICI) vacuum coated with a thin layer of titanium (200 angstroms) and gravure roll coating on the titanium side of the web with a thin layer of polyester (49000, available from E. I. duPont de Nemours & Co.) using a solution of polyester, 0.5 percent by weight solids, in a 70:30 volume ratio of tetrahydrofuran/cyclohexane. After drying at 135° C. for about 5 minutes, the adhesive layer had a thickness of about 500 angstroms. The dried adhesive layer was then overcoated with a dielectric imaging layer by extrusion coating of 10 percent by weight solids solution of polycarbonate (Makrolon, available from Farbenfabricken Bayer A.G.) in methylene containing 5 percent by weight, based on the total weight of the dry coating, of gamma aminopropyl triethoxysilane surface treated micro-crystalline silica (available from Malvern Minerals). The polycarbonate dielectric imaging layer had a thickness of about 18 micrometers after drying at 135° C. for about 5 minutes. It was noted that the presence of silica in the polycarbonate dielectric imaging layer did not alter the thermal contraction coefficient of the layer. An outer substrate was prepared by combining 9.9 percent by weight polycarbonate resin (Makrolon 5705, available from Farbenfabricken Bayer AG), 0.1 percent by weight copolyester resin (Vitel PE 100, available from Goodyear Tire and Rubber Co.) and 90 percent by weight of methylene chloride in a carboy container to form a coating solution containing 10 percent solids. The container was covered tightly and placed on a roll mill for about 24 hours until the polycarbonate and copolyester were dissolved in the methylene chloride. The outer substrate layer coating solution was applied to the rear surface (side opposite the titanium layer) of the electrographic imaging member by extrusion coating and dried at 135° C. for about 5 minutes to produce a dried film having a thickness of 18 micrometers. The resulting electrographic imaging member was flat. Since both the dielectric imaging layer and the outer substrate layer were fabricated with polycarbonate, they had the same thermal contraction coefficient mismatch with respect to the biaxially oriented polyethylene terephthalate inner substrate. The linear tension force calculated for $F_{t1}=F_{t2}=1.228$ pounds per inch imaging member width or 200.7 grams per centimeter width of the imaging member.

EXAMPLE XXIII

An electrographic imaging member was fabricated using the same procedures and identical materials as described in Example XXII, except that 5 percent by weight of gamma ray irradiated polytetrafluoroethylene (PTFE) particulates (Polymist, available from Ausimont USA, Inc.) was substituted for the 5 percent by weight of microcrystalline silica. It was noted that the presence of PTFE particulates in the polycarbonate dielectric imaging layer did not alter the thermal contraction coefficient of the layer. Since both the dielectric imaging layer and the outer substrate layer had the same thermal contraction coefficient mismatch with respect to the biaxially oriented polyethylene terephthalate inner substrate, the linear tension force calculated for $F_{t1}=F_{t2}=1.228$ pounds per inch imaging member width or 200.7 grams per centimeter width of the imaging member. The resulting electrographic imaging member was flat.

EXAMPLE XXIV

An electrographic imaging member was fabricated using the same procedures and identical materials as described in Example XXII, except that 5 percent by weight, based on the total weight of the dry coating, of gamma aminopropyl triethoxysilane surface treated micro-crystalline silica (available from Malvern Minerals) was incorporated into the copolyester resin of polyethylene terephthalate glycol (Kodar PETG, available from Eastman Chemical Products, Inc.) coating composition for the Makrolon dielectric layer replacement. Since this PETG dielectric imaging layer adhered strongly to the titanium conductive ground plane, the thin 49000 adhesive layer was omitted. The application of an outer substrate layer was unnecessary to achieve the desired electrographic imaging member flatness. Since the thermal contraction coefficient of the PETG dielectric imaging layer was substantially the same as that of the biaxially oriented polyethylene terephthalate substrate, the linear tension force $F_{t1}$ was, therefore, equal to zero an the fabricated bi-layered electrographic imaging member was curl-free.

EXAMPLE XXV

An electrographic imaging member was fabricated using the same procedures and identical materials as described in Example XXIV, except that 5 percent by weight, based on the total weight of the dry coating, of polytetrafluoroethylene particles (Algoflon, available from Ausimont USA, Inc.) was incorporated into the copolyester resin of polyethylene terephthalate glycol (Kodar PETG, available from Eastman Chemical Products, Inc.) coating composition for the dielectric layer. Since the thermal contraction coefficient of the PETG dielectric imaging layer was substantially the same as that of the biaxially oriented polyethylene terephthalate substrate, the linear tension force $F_{t1}$ was, therefore, equal to zero and the fabricated bi-layered electrographic imaging member was curl-free.

EXAMPLE XXVI

An electrographic imaging member was fabricated using the same procedures and identical materials as described in Example XXIV, except that 5 percent by weight, based on the total weight of the dry coating, of polyethylene wax particles (ACumist, available from Allied-Signal, Inc.) was incorporated into the copolyester resin of polyethylene terephthalate glycol (Kodar PETG, available from Eastman Chemical Products, Inc.) coating composition for the dielectric layer. Since the thermal contraction coefficient of the PETG dielectric imaging layer was substantially the same as that of the biaxially oriented polyethylene terephthalate substrate, the linear tension force $F_{t1}$ was, therefore, equal to zero and the fabricated bi-layered electrographic imaging member was curl-free.

EXAMPLE XXVII

An electrographic imaging member was fabricated using the same procedures and identical materials as described in Example XXIV, except that 5 percent by weight, based on the total weight of the dry coating of a particulate fatty amide derived from the reaction product between erucic acid and ammonia (Petrac Erucamide, available from Synthetic Products Company) was incorporated into the copolyester resin of polyethylene terephthalate glycol (Kodar PETG, available from Eastman Chemical Products, Inc.) coating composition for the dielectric layer. Since the thermal contraction coefficient of the PETG dielectric imaging layer was substantially the same as that of the biaxially oriented polyethylene terephthalate substrate, the linear tension force $F_{t1}$ was, therefore, equal to zero and the fabricated bi-layered electrographic imaging member was curl-free.

EXAMPLE XXVIII

The imaging surface of the dielectric layers of electrographic imaging member samples prepared as described in Examples I, XI, XXII, XXIII and, XXIV through XXVII were evaluated for friction characteristics and wear. More specifically, the coefficient of surface contact friction of the dielectric layer of these Examples were measured against a polyurethane cleaning blade (EIO-75, available from Acusnet). The coefficient of friction test was carried out by first anchoring a test electrographic imaging member sample (with the dielectric imaging layer facing upwardly) on a platform surface. The polyurethane cleaning blade was then secured to the bottom surface of a horizontally sliding plate weighing 200 grams. The sliding plate, having the polyurethane blade sample facing downwardly was dragged in a straight line over the platform against the dielectric imaging layer. The sliding plate was connected to one end of a thin cable threaded around a low friction pulley and attached to the gripping jaws of an Instron Tester. The sliding plate bearing the polyurethane blade was then dragged over the dielectric imaging layer when the cable was pulled by the Instron Tester. The force required to pull the sliding plate with the blade over the dielectric surface was monitored with a chart recorder. The coefficient of surface contact friction for each test sample described above was calculated by dividing the force obtained by 200 grams.

For the wear resistance tests, the above described electrographic imaging members were cut into 1 inch in width by 12 inches in length test samples. Testing was effected by means of a dynamic mechanical cycling device in which glass tubes were skidded across the surface of the dielectric imaging layer on each test sample. More specifically, one end of each test same as clamped to a stationary post and the sample was looped upwardly over three equally spaced horizontal glass tubes and then downwardly over a stationary guide tube through a generally inverted "U" shaped path with the free end of sample secured to a weight which provided one pound per inch width tension on each sample. The face of each test electroreceptor sample bearing the dielectric imaging layer faced downwardly so that it would contact the glass tubes to achieve sliding mechanical interaction during wear testing. The glass tubes, each having a diameter of one inch, were secured at each tube end to an adjacent vertical surface of a pair of disks that were rotatable about a shaft connecting the centers of the disks. The glass tubes were parallel to and equidistant from each other and equidistant from the shaft connecting the centers of the disks. Although the disks were rotated about the shaft, each glass tube was rigidly secured to the adjacent disk to prevent rotation of the tubes around each individual tube axis. Thus, as the disk rotated bout the shaft, two glass tubes were maintained at all times in sliding contact with the surface of the dielectric imaging layer. The axis of each glass tube was positioned about 4 cm from the shaft. The direction of movement of the glass tubes along the dielectric layer surface was away from the weighted end of each sample and toward the end clamped to the stationary post. Since there were three glass tubes in the test device, each complete rotation of the disk was equivalent to three wear cycles in which the surface of the dielectric layer would be in sliding contact with a single stationary support tube during testing. The rotation rate of the spinning disk was adjusted to provide the equivalent of 11.3 inches per second tangential speed. The extent of dielectric layer wear for 330,000 wear cycles of testing was measured using a permascope.

The results obtained for the coefficient of surface contact and wear measurements are listed in Table I below. These data show that incorporation of filler particulates in the polymer matrix of the dielectric layers of embodiments of the electroreceptors of this invention can produce marked improvement in their frictional properties as well as enhanced wear resistance. At 5 percent by weight particulate additives, the coefficient of friction of the dielectric layer against the cleaning blade was seen to reduce by up to 65 percent and the wear resistance was improved by about 2½ times.

TABLE I

| EXAMPLE | COEFFICIENT OF FRICTION | AMOUNT OF WEAR (Micrometers) |
|---|---|---|
| I (polycarbonate Control) | 3.8 | 12.0 |
| XXII | 1.6 | 3.8 |
| XXIII | 1.4 | 4.8 |
| XI (PETG Control) | 3.8 | 13.5 |
| XXIV | 1.7 | 5.1 |
| XXV | 1.5 | 6.3 |
| XXVI | 1.5 | 6.5 |
| XXVII | 1.3 | 6.5 |

EXAMPLE XXIX

The fabricated electrographic imaging members of Examples I, IV, VII, VIII, XIX, X, XI, XIV, XV, XVI, XVIII, XIX, XXII, XXIII, XXVI and XXVII were evaluated for a liquid developer, compatibility. The liquid ink contained pigment material dispersed in a mineral oil liquid carrier. The reaction of each imaging member to the combination of stress and ink exposure was tested by static-bend parking on a 2-inch width imaging member sample over a 19 mm diameter roll to induce a high bending stress in the dielectric imaging layer while a cotton swab saturated with ink rested on top of the bent section of the imaging member sample to provide ink/dielectric imaging layer contact. Each test sample was examined for surface cracking daily using a reflection optical microscope at 100× magnification. The low volatility of the mineral oil carrier liquid in the ink coupled with the capillary action of the cotton swab provided an abundant ink supply to ensure constant ink/sample contact during two months of stress/ink exposure testing. The same testing procedures were repeated for each virgin imaging member sample but with each of the oil carrier liquids, used in various ink formulations, such as Mineral Oil (available from Shell Chemicals Company), Magiesol (available from Magie Oil Company), and Isopar L (available from Exxon Company). No imaging member/ink or oil induced dielectric layer surface cracking was noted for each of the samples after two months of exposure testing, indicating good material/ink compatibility of the electrographic imaging members of the present invention.

EXAMPLE XXX

Dielectric belts of Examples I, II and III, having dielectric imaging layer (Makrolon) thicknesses of 10, 12, and 18 micrometers, were tested in an electrographic imaging device in which an electrostatic latent image was formed on the exposed imaging surface of the dielectric imaging layer by ion stream imaging and developed with a liquid developer. The exposed imaging surface of the dielectric imaging layer was uniformly charged by corona charging and discharged in image configuration by means of a fluid jet assisted ion projection head. Ions were generated in a chamber in the fluid jet assisted ion projection head were entrained in a rapidly moving air stream passing into, through and out of the chamber, modulated in an electroded exit zone by being selectively emitted or inhibited therein, and finally deposited in an imagewise pattern on the dielectric imaging layer. The chamber in the fluid jet assisted ion projection head contained a corona generator wire which ionized the air. The exiting ion laden air was directed adjacent to the modulation structure for turning "on" and "off" the ion flow to the dielectric imaging layer thereby facilitating deposition in an imagewise pattern on the dielectric imaging layer. The fluid jet assisted ion projection head output as at 250 V and provided a 4 line pairs per mm resolution. The liquid developer used for development of the electrostatic latent image was a Magiesol base ink and the ink applicator was a 200 lines per inch gravure roll. Makrolon with a dielectric constant of approximately 3.2, a thickness of 10 micrometers, and a steep gamma of 70 V contrast potential change between 87.5 and 12.5 percent output density gave the best print result. No print-out defects attributed to dielectric imaging layer cracking were notable after 5,000 copies of imaging.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A flexible electrographic imaging member comprising:

(a) a flexible dielectric imaging layer having a uniform thickness of between about 10 micrometers and about 50 micrometers and comprising a thermoplastic film forming polymer wherein said dielectric imaging layer is free of photoconductive material, and (b) a flexible supporting substrate having an electrically conductive surface, said substrate comprising a single substrate layer having a uniform thickness and between about 25 micrometers and about 200 micrometers and comprising a thermoplastic film forming polymer wherein said dielectric imaging layer and said single substrate layer have thermal coefficients of contraction that are substantially the same.

2. An electrographic imaging member according to claim 1 wherein said supporting substrate comprises a film forming binder and inorganic particles.

3. An electrographic imaging member according to claim 1 wherein a thin electrically conductive layer is interposed between said flexible supporting substrate and said dielectric imaging layer.

4. An electrographic imaging member according to claim 1 wherein said single substrate layer and has a thickness of between about 40 micrometers and about 130 micrometers.

5. An electrographic imaging member according to claim 1 wherein said single substrate layer and has a thickness of between about 50 micrometers and about 75 micrometers.

6. A flexible electrographic imaging member comprising:

(a) a flexible dielectric imaging layer having a uniform thickness of between about 10 micrometers and about 50 micrometers and comprising a thermoplastic film forming polymer, and (b) a flexible supporting substrate having an electrically conductive surface, said substrate comprising dual layers comprising an inner substrate layer and an outer substrate layer, said inner substrate layer having a uniform thickness of between about 25 micrometers and about 200 micrometers and comprising a thermoplastic film forming polymer and said outer substrate layer having a uniform thickness of between about 10 micrometers and about 50 micrometers and comprising a thermoplastic film forming polymer, wherein said dielectric imaging layer has a linear tension force ($F_{t1}$) measured along a plane of said dielectric imaging layer and said outer substrate layer has a linear tension force ($F_{t2}$) measured along a plane of said outer substrate layer in a direction which is the same as for determining said linear tension force ($F_{t1}$), $F_{t1}$ minus $F_{t2}$ being less than about ±20 percent with respect to $F_{t1}$ wherein said $F_{t1}$ is:

$$=(A_1)(M_1)[\Delta t_1(\epsilon_1-\epsilon_S)]$$

and said $F_{t2}$ is:

$$=(A_2)(M_2)[\Delta t_2(\epsilon_2-\epsilon_S)]$$

wherein:

$A_1$ is cross section of said dielectric imaging layer, $A_2$ is cross section of said outer substrate layer, $M_1$ is Young's Modulus of said dielectric imaging layer, $M_2$ is Young's Modulus of said outer substrate layer, $\Delta t_1$ is highest processing temperature of said dielectric imaging layer minus ambient temperature, $\Delta t_2$ is highest processing temperature of said outer substrate layer minus ambient temperature, $\epsilon_1$ is thermal coefficient of contraction of said dielectric imaging layer, $\epsilon_S$ is thermal coefficient of contraction of said inner substrate layer, and $\epsilon_2$ is thermal coefficient of contraction of said outer substrate layer.

7. An electrographic imaging member according to claim 6 wherein said supporting substrate comprises a film forming binder and organic particles.

8. An electrographic imaging member according to claim 6 wherein said dual layers comprise an inner substrate layer having a thickness between about 40 micrometers and about 130 micrometers and an outer substrate layer having a thickness between about 13 micrometers and about 40 micrometers.

9. An electrographic imaging member according to claim 8 wherein said inner substrate layer has a uniform thickness of between about 50 micrometers and about 75 micrometers.

10. An electrographic imaging member according to claim 8 wherein said outer substrate layer has a uniform thickness of between about 16 micrometers and about 30 micrometers.

11. An electrographic imaging process comprising providing a flexible electrographic imaging member comprising a flexible dielectric imaging layer having a uniform thickness of between about 10 micrometers and about 50 micrometers and comprising a thermoplastic film forming polymer, and a flexible supporting substrate having an electrically conductive surface, said substrate comprising a single substrate layer having a uniform thickness of between about 25 micrometers and about 200 micrometers and comprising a thermoplastic film forming polymer wherein said dielectric imaging layer and said single substrate layer have thermal coefficients of contraction that are substantially the same.

12. An electrographic imaging process according to claim 11 wherein said dielectric imaging layer comprises a film forming binder and inorganic particles.

13. An electrographic imaging process according to claim 11 wherein said flexible supporting substrate comprises a film forming binder and inorganic particles.

14. An electrographic imaging process according to claim 11 wherein said flexible supporting substrate comprises a film forming binder and organic particles.

15. An electrographic imaging process according to claim 11 wherein said single substrate layer has a thickness of between about 40 micrometers and about 130 micrometers.

16. An electrographic imaging process according to claim 11 wherein said single substrate layer has a thickness of between about 50 micrometers and about 75 micrometers.

17. An electrographic imaging process comprising providing a flexible electrographic imaging member comprising dual layers comprising an inner substrate layer and an outer substrate layer, wherein said inner substrate layer has a uniform thickness of between about 25 micrometers and about 200 micrometers and said outer substrate layer has a uniform thickness of between about 10 micrometers and about 50 micrometers and comprising a thermoplastic film forming polymer, wherein said dielectric imaging layer has a linear tension force ($F_{t1}$) measured along a plane of said dielectric imaging layer and said outer substrate layer has a linear tension force ($F_{t2}$) measured along a plane of said outer substrate layer in a direction which is the same as said direction for determining said linear tension force ($F_{t1}$), $F_{t1}$ minus $F_{t2}$ is less than about ±20 percent with respect to $F_{t1}$, wherein said $F_{t1}$ is:

$$=(A_1)(M_1)[\Delta t_1(\epsilon_1-\epsilon_2)]$$

and said $F_{t2}$ is:

$$=(A_2)(M_2)[\Delta t_2(\epsilon_2-\epsilon_S)]$$

wherein:

$A_1$ is cross section of said dielectric imaging layer, $A_2$ is cross section of said outer substrate layer, $M_1$ is Young's Modulus of said dielectric imaging layer, $M_2$ is Young's Modulus of said outer substrate layer, $\Delta t_1$ is highest processing temperature of said dielectric imaging layer minus ambient temperature, $\Delta t_2$ is highest processing temperature of said outer substrate layer minus ambient temperature, $\epsilon_1$ is thermal coefficient of contraction of said dielectric imaging layer, $\epsilon_S$ is thermal coefficient of contraction of said inner substrate layer, and $\epsilon_2$ is thermal coefficient of contraction of said outer substrate layer, forming an electrostatic latent image on said imaging member, forming a toner image on said imaging member in conformance with said electrostatic latent image and transferring said toner image to a receiving member.

18. An electrographic imaging process according to claim 17 wherein said dielectric imaging layer comprises a film forming binder and inorganic particles.

19. An electrographic imaging process according to claim 17 wherein said dielectric imaging layer comprises a film forming binder and organic particles.

20. An electrographic imaging process according to claim 17 including forming said electrostatic latent image on said imaging member by fluid jet assisted ion projection.

21. An electrographic imaging process according to claim 17 wherein said inner substrate layer has a uniform thickness of between about 40 micrometers and about 130 micrometers and said outer substrate layer has a uniform thickness of between about 13 micrometers and about 40 micrometers and comprise a thermoplastic film forming polymer.

22. An electrographic imaging process according to claim 17 wherein said dielectric imaging layer is free of photoconductive material, said dielectric imaging layer has a linear tension force ($F_{t1}$) measured along a plane of said dielectric imaging layer and said outer substrate layer has a linear tension force ($F_{t2}$) measured along a plane of said outer substrate layer in a direction which is the same as said direction for determining said linear tension force ($F_{t1}$), minus $F_{t2}$ is less than about ±15 percent with respect to $F_{t1}$.

* * * * *